US008996015B2

United States Patent
Pani et al.

(10) Patent No.: US 8,996,015 B2
(45) Date of Patent: *Mar. 31, 2015

(54) METHOD AND APPARATUS FOR DETECTING AND MEASURING FOR HOME NODE-BS

(71) Applicant: InterDigital Patent Holdings, Inc., Wilmington, DE (US)

(72) Inventors: Diana Pani, Montreal (CA); Paul Marinier, Brossard (CA); Sylvie Gomes, Douglaston, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/106,077

(22) Filed: Dec. 13, 2013

(65) Prior Publication Data

US 2014/0099948 A1 Apr. 10, 2014

Related U.S. Application Data

(63) Continuation of application No. 12/818,474, filed on Jun. 18, 2010, now Pat. No. 8,634,836.

(60) Provisional application No. 61/218,824, filed on Jun. 19, 2009, provisional application No. 61/248,003, filed on Oct. 2, 2009, provisional application No. 61/247,968, filed on Oct. 2, 2009, provisional application No. 61/250,255, filed on Oct. 9, 2009.

(51) Int. Cl.
*H04W 36/00* (2009.01)
*H04W 48/16* (2009.01)
(Continued)

(52) U.S. Cl.
CPC .............. *H04W 48/16* (2013.01); *H04W 24/10* (2013.01); *H04W 48/20* (2013.01); *H04W 84/045* (2013.01)

USPC ........ 455/440; 455/436; 455/437; 455/435.1; 455/435.2; 455/439; 455/67.11; 455/552.1; 455/68; 455/69; 370/331

(58) Field of Classification Search
USPC ........... 455/435.1, 435.2, 436–440, 442, 443, 455/456.1, 456.6, 67.11, 67.13, 67.15, 68, 455/69, 552.1, 553.1; 370/328–338
See application file for complete search history.

(56) References Cited

U.S. PATENT DOCUMENTS

| 5,444,764 A | 8/1995 | Galecki |
| 6,373,949 B1 | 4/2002 | Aura |

(Continued)

FOREIGN PATENT DOCUMENTS

| EP | 1 947 889 | 7/2008 |
| GB | 2 315 193 | 1/1998 |

(Continued)

OTHER PUBLICATIONS

Ericsson et al., "LTE Home NB Text Proposal", 3GPP TSG RAN WG3 Meeting #55bis, R3-070714, (St. Julian's, Malta, Mar. 27-30, 2007).

(Continued)

*Primary Examiner* — Tuan A Tran
(74) *Attorney, Agent, or Firm* — Volpe and Koenig, P.C.

(57) ABSTRACT

Methods and apparatus are disclosed for a wireless transmit/receive unit (WTRU) to detect and perform measurements with respect to Home Node-Bs (HNB) and Home evolved Node-Bs (H(e)NB) (collectively "HNB"). The methods may include generating and transmitting a request for a measurement configuration that may include gap allocations to detect and measure a primary scrambling code or a physical cell identity of a target HNB for at least one frequency or radio access technology (RAT). The request may be in response to the WTRU entering a HNB cell for which the WTRU has stored fingerprint information and whose closed subscriber group ID is in the WTRU's whitelist. The network may configure the WTRU to measure the requested frequency or RAT in response to the proximity report/request. Methods are described for releasing the measurement configuration.

22 Claims, 8 Drawing Sheets

(51) Int. Cl.
*H04W 24/10* (2009.01)
*H04W 48/20* (2009.01)
*H04W 84/04* (2009.01)

(56) References Cited

U.S. PATENT DOCUMENTS

| | | | |
|---|---|---|---|
| 6,385,461 | B1 | 5/2002 | Raith |
| 6,826,414 | B1 | 11/2004 | Reynolds et al. |
| 8,169,982 | B2 | 5/2012 | Gogic et al. |
| 8,249,595 | B2 | 8/2012 | Iwamura et al. |
| 8,509,783 | B2 | 8/2013 | Iwamura |
| 8,625,535 | B2 | 1/2014 | Ishida et al. |
| 8,676,204 | B2 | 3/2014 | Uemura et al. |
| 2006/0264217 | A1 | 11/2006 | Shaheen |
| 2007/0097914 | A1 | 5/2007 | Grilli et al. |
| 2008/0220782 | A1 | 9/2008 | Wang et al. |
| 2008/0267153 | A1 | 10/2008 | Mukherjee et al. |
| 2009/0047968 | A1 | 2/2009 | Gunnarsson et al. |
| 2009/0168727 | A1* | 7/2009 | Somasundaram et al. .... 370/332 |
| 2009/0185524 | A1 | 7/2009 | Sammour et al. |
| 2009/0239533 | A1* | 9/2009 | Somasundaram et al. .... 455/434 |
| 2009/0262682 | A1* | 10/2009 | Khetawat et al. ............. 370/328 |
| 2009/0265542 | A1* | 10/2009 | Khetawat et al. ............. 713/151 |
| 2009/0265543 | A1* | 10/2009 | Khetawat et al. ............. 713/151 |
| 2009/0275326 | A1* | 11/2009 | Lee et al. .................... 455/422.1 |
| 2009/0325634 | A1* | 12/2009 | Bienas et al. ............... 455/552.1 |
| 2010/0069119 | A1* | 3/2010 | Mueck et al. ................. 455/561 |
| 2010/0075670 | A1* | 3/2010 | Wu ............................... 455/434 |
| 2010/0075698 | A1* | 3/2010 | Rune et al. .................... 455/458 |
| 2010/0110945 | A1* | 5/2010 | Koskela et al. ............... 370/328 |
| 2010/0130197 | A1* | 5/2010 | Wu ................................ 455/433 |
| 2010/0234028 | A1* | 9/2010 | Narasimha et al. ........... 455/437 |

FOREIGN PATENT DOCUMENTS

| | | |
|---|---|---|
| JP | 2008-236727 | 10/2008 |
| JP | 2009-111624 | 5/2009 |
| WO | 98/49856 | 11/1998 |
| WO | 00/30375 | 5/2000 |
| WO | 2005/115042 | 12/2005 |
| WO | 2009/001269 | 12/2008 |
| WO | 2009/020361 | 2/2009 |
| WO | 2009/043002 | 4/2009 |
| WO | 2009/044318 | 4/2009 |
| WO | 2009/067452 | 5/2009 |

OTHER PUBLICATIONS

Huawei, "Cell re-selection for hNB," 3GPP TSG RAN2 #60, R2-074831(Nov. 5-9, 2007).
Huawei, "Measurement Gap Scheduling in HO Procedure in LTE," 3GPP TSG RAN2 Meeting #52, Athens, Greece, Mar. 27-31, 2006.
Motorola, "[66b#5] UMTSLTE: Inbound CSG Mobility LTE," 3GPP TSG-RAN WG2 Meeting #67, Shenzhen, China, Aug. 24-28, 2009.
Nokia Corporation et al., "CSG Cell Identification for Mobility and Measurement Reporting," 3GPP TSG-RAN WG2 Meeting #59bis, R2-073920 (Oct. 8-12, 2007).
NTT DoCoMo, Inc., "Cell ID Assignment for Home Node B," 3GPP TSG RAN WG2 Meeting #59, R2-073374 (Aug. 20-24, 2007).
Qualcomm Europe, "Measurement and mobility issues for home (e)Node Bs," 3GPP TSG-RAN WG2 #59bis, R2-074117 (Oct. 2007).
Qualcomm, "[66b#4] UMTSLTE: Inbound CSG Mobility UMTS," 3GPP TSG-RAN WG2 Meeting #67, Shenzhen, China, Aug. 24-28, 2009.
Rapporteur Huawei et al., "Home NB and Home eNB Enhancements RAN2 Aspects," TSG-RAN Meeting #45, Seville, Spain, Sep. 15-18, 2009.
Samsung, "Inbound Mobility to H(e)NBs," 3GPP TSG-RAN WG2 Meeting #66, San Francisco, U.S.A., May 4-8, 2009.
Samsung, "Measurement of home & private eNBs," 3GPP TSG-RAN2 Meeting #59, R2-073307 (Aug. 2007).
Third Generation Partnership Project, "Technical Specification Group Radio Access Network; Radio Resource Control (RRC) Protocol Specification (Release 8)," 3GPP TS 25.331 v8.6.0, Mar. 2009.
Third Generation Partnership Project, "Technical Specification Group Radio Access Network; Radio Resource Control (RRC) Protocol Specification (Release 8)," 3GPP TS 25.331 v8.10.0, Apr. 2010.
Third Generation Partnership Project, "Technical Specification Group Radio Access Network; Radio Resource Control (RRC) Protocol Specification (Release 9)," 3GPP TS 25.331 v9.2.1, Apr. 2010.
Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)," 3GPP TS 36.300 v8.9.0, Jun. 2009.
Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)," 3GPP TS 36.300 v8.12.0, Apr. 2010.
Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 9)," 3GPP TS 36.300 v9.0.0, Jun. 2009.
Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 9)," 3GPP TS 36.300 v9.3.0, Apr. 2010.
Third Generation Partnership Project, "Technical Specification Group Radio Access Network; Evolved Universal Terrestrial Radio Access (E-UTRA); User Equipment (UE) Procedures in Idle Mode (Release 8)," 3GPP TS 36.304 v8.6.0, Jun. 2009.
Third Generation Partnership Project, "Technical Specification Group Radio Access Network; Evolved Universal Terrestrial Radio Access (E-UTRA); User Equipment (UE) Procedures in Idle Mode (Release 8)," 3GPP TS 36.304 v8.8.0, Jan. 2010.
Third Generation Partnership Project, "Technical Specification Group Radio Access Network; Evolved Universal Terrestrial Radio Access (E-UTRA); User Equipment (UE) Procedures in Idle Mode (Release 9)," 3GPP TS 36.304 v9.3.0, Jun. 2010.
Third Generation Partnership Project, "Technical Specification Group Radio Access Network; Evolved Universal Terrestrial Radio Access (E-UTRA); Radio Resource Control (RRC); Protocol Specification (Release 8)," 3GPP TS 36.331 v8.6.0, Jun. 2009.
Third Generation Partnership Project, "Technical Specification Group Radio Access Network; Evolved Universal Terrestrial Radio Access (E-UTRA); Radio Resource Control (RRC); Protocol Specification (Release 8)," 3GPP TS 36.331 v8.9.0, Apr. 2010.
Third Generation Partnership Project, "Technical Specification Group Radio Access Network; Evolved Universal Terrestrial Radio Access (E-UTRA); Radio Resource Control (RRC); Protocol Specification (Release 9)," 3GPP TS 36.331 v9.2.0, Apr. 2010.
Third Generation Partnership Project, "Technical Specification Group Services and System Aspects; Service accessibility (Release 10)," 3GPP TS 22.011 V10.1.0 (Sep. 2010).
Third Generation Partnership Project, "Technical Specification Group Services and System Aspects; Service accessibility (Release 9)," 3GPP TS 22.011 V9.4.0 (Jun. 2010).
Third Generation Partnership Project, "Technical Specification Group Services and System Aspects; Service accessibility (Release 9)," 3GPP TS 22.011 V9.2.0 (Sep. 2009).
Third Generation Partnership Project, "Technical Specification Group Services and System Aspects; Service accessibility (Release 8)," 3GPP TS 22.011 V8.9.0 (Sep. 2009).
Third Generation Partnership Project, "Technical Specification Group Services and System Aspects; Service accessibility (Release 7)," 3GPP TS 22.011 V7.9.0 (Mar. 2008).
Third Generation Partnership Project, "Technical Specification Group Radio Access Network; Mobility Procedures for Home NodeB; Overall Description; Stage 2 (Release 9)," 3GPP TS 25.367 V9.1.0 (Sep. 2009).
Third Generation Partnership Project, "Technical Specification Group Radio Access Network; Mobility procedures for Home Node B (HNB); Overall description; Stage 2 (Release 9)," 3GPP TS 25.367 V9.4.0 (Jun. 2010).

(56) References Cited

OTHER PUBLICATIONS

Third Generation Partnership Project, "Technical Specification Group Radio Access Network; Mobility Procedures for Home NodeB; Overall Description; Stage 2 (Release 8)," 3GPP TS 25.367 V8.3.0 (Dec. 2009).

Third Generation Partnership Project, "Technical Specification Group Radio Access Network; Mobility Procedures for Home NodeB; Overall Description; Stage 2 (Release 8)," 3GPP TS 25.367 V8.2.0 (Sep. 2009).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.10.0 (Jun. 2010).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.3.0 (Jun. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.0.0 (Jun. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.4.0 (Jun. 2010)

Third Generation Partnership Project, "Technical Specification Group Radio Access Network; Radio Resource Control (RRC) protocol specification (Release 1999)," 3GPP TS 25.331 V3.21.0 (Dec. 2004).

Third Generation Partnership Project, "Technical Specification Group Radio Access Network; Radio Resource Control (RRC); Protocol Specification (Release 4)," 3GPP TS 25.331 V4.20.0 (Dec. 2008).

Third Generation Partnership Project, "Technical Specification Group Radio Access Network; Radio Resource Control (RRC); Protocol specification (Release 10)," 3GPP TS 25.331 V10.0.0 (Jun. 2010).

Third Generation Partnership Project, "Technical Specification Group Radio Access Network; Radio Resource Control (RRC); Protocol specification (Release 8)," 3GPP TS 25.331 V8.11.0 (Jun. 2010).

Third Generation Partnership Project, "Technical Specification Group Radio Access Network; Radio Resource Control (RRC); Protocol specification (Release 9)," 3GPP TS 25.331 V9.3.0 (Jun. 2010).

Third Generation Partnership Project, "Technical Specification Group Radio Access Network; Radio Resource Control (RRC); Protocol Specification (Release 5)," 3GPP TS 25.331 V5.24.0 (Jun. 2009).

Third Generation Partnership Project, "Technical Specification Group Radio Access Network; Radio Resource Control (RRC); Protocol Specification (Release 7)," 3GPP TS 25.331 V7.17.0 (Jun. 2010).

Third Generation Partnership Project, "Technical Specification Group Radio Access Network; Radio Resource Control (RRC); Protocol Specification (Release 7)," 3GPP TS 25.331 V7.12.1 (Apr. 2009).

Third Generation Partnership Project, "Technical Specification Group Radio Access Network; Radio Resource Control (RRC); Protocol Specification (Release 6)," 3GPP TS 25.331 V6.22.0 (Jun. 2009).

Third Generation Partnership Project, "Technical Specification Group Radio Access Network; Radio Resource Control (RRC); Protocol Specification (Release 5)," 3GPP TS 25.331 V5.22.0 (May 2008).

Third Generation Partnership Project, "Technical Specification Group Radio Access Network; Radio Resource Control (RRC); Protocol Specification (Release 6)," 3GPP TS 25.331 V6.25.0 (Mar. 2010).

Third Generation Partnership Project, "Technical Specification Group Radio Access Network; Requirements for support of radio resource managment (FDD) (Release 9)," 3GPP TS 25.133 V9.3.0 (Mar. 2010).

Third Generation Partnership Project, "Technical Specification Group Radio Access Network; Requirements for support of radio resource managment (FDD) (Release 9)," 3GPP TS 25.133 V9.0.0 (May 2009).

Third Generation Partnership Project, "Technical Specification Group Radio Access Network; Requirements for support of radio resource management (FDD) (Release 8)," 3GPP TS 25.133 V8.10.0 (Mar. 2010).

Third Generation Partnership Project, "Technical Specification Group Radio Access Network; User Equipment (UE) procedures in idle mode and procedures for cell reselection in connected mode (Release 4)," 3GPP TS 25.304 V4.8.0 (Mar. 2004).

Third Generation Partnership Project, "Technical Specification Group Radio Access Network; User Equipment (UE) procedures in idle mode and procedures for cell reselection in connected mode (Release 7)," 3GPP TS 25.304 V7.7.0 (Sep. 2008).

Third Generation Partnership Project, "Technical Specification Group Radio Access Network; User Equipment (UE) procedures in idle mode and procedures for cell reselection in connected mode (Release 6)," 3GPP TS 25.304 V6.10.0 (Mar. 2008).

Third Generation Partnership Project, "Technical Specification Group Radio Access Network; User Equipment (UE) procedures in idle mode and procedures for cell reselection in connected mode (Release 8)," 3GPP TS 25.304 V8.6.0 (Jun. 2009).

Third Generation Partnership Project, "Technical Specification Group Radio Access Network; Requirements for support of radio resource management (FDD) (Release 6)," 3GPP TS 25.133 V6.24.0 (Mar. 2009).

Third Generation Partnership Project, "Technical Specification Group Radio Access Network; User Equipment (UE) procedures in idle mode and procedures for cell reselection in connected mode (Release 7)," 3GPP TS 25.304 V7.8.0 (Sep. 2009).

Third Generation Partnership Project, "Technical Specification Group Radio Access Network; User Equipment (UE) procedures in idle mode and procedures for cell reselection in connected mode (Release 5)," 3GPP TS 25.304 V5.9.0 (Sep. 2005).

Third Generation Partnership Project, "Technical Specification Group Radio Access Network; Requirements for support of radio resource management (FDD) (Release 7)," 3GPP TS 25.133 V7.14.0 (Mar. 2009).

Third Generation Partnership Project, "Technical Specification Group Radio Access Network; Requirements for support of radio resource management (FDD) (Release 1999)," 3GPP TS 25.133 V3.22.0 (Sep. 2005).

Third Generation Partnership Project, "Technical Specification Group Radio Access Network; Requirements for support of radio resource management (FDD) (Release 4)," 3GPP TS 25.133 V4.17.0 (Mar. 2006).

Third Generation Partnership Project, "Technical Specification Group Radio Access Network; Requirements for support of radio resource management (FDD) (Release 8)," 3GPP TS 25.133 V8.7.0 (May 2009).

Third Generation Partnership Project, "Technical Specification Group Radio Access Network; User Equipment (UE) procedures in idle mode and procedures for cell reselection in connected mode (Release 9)," 3GPP TS 25.304 V9.2.0 (Jun. 2010).

Third Generation Partnership Project, "Technical Specification Group Radio Access Network; Requirements for support of radio resource management (FDD) (Release 7)," 3GPP TS 25.133 V7.15.0 (Sep. 2009).

Third Generation Partnership Project, "Technical Specification Group Radio Access Network; Mobility Procedures for Home NodeB; Overall Description; Stage 2 (Release 9)," 3GPP TS 25.367 V9.0.0 (Jun. 2009).

Third Generation Partnership Project, "Technical Specification Group Radio Access Network; User Equipment (UE) procedures in idle mode and procedures for cell reselection in connected mode(Release 1999)," 3GPP TS 25.304 V3.14.0 (Mar. 2004).

(56) References Cited

OTHER PUBLICATIONS

Third Generation Partnership Project, "Technical Specification Group Radio Access Network; Mobility Procedures for Home NodeB; Overall Description; Stage 2 (Release 8)," 3GPP TS 25.367 V8.1.0 (Mar. 2009).

Third Generation Partnership Project, "Technical Specification Group Radio Access Network; Requirements for support of radio resource management (FDD) (Release 5)," 3GPP TS 25.133 V5.18.0 (Sep. 2007).

Third Generation Partnership Project, "Technical Specification Group Radio Access Network; User Equipment (UE) procedures in idle mode and procedures for cell reselection in connected mode (Release 8)," 3GPP TS 25.304 V8.10.0 (Jun. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.3.0 (Dec. 2007).

Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.5.0 Release 8), ETSI TS 136 300 V8.5.0 (Jul. 2008).

Vodafone Group, "Tracking Areas Concepts", 3GPP TSG RAN WG3 #55, R3-070112, (St. Louis, USA, Feb. 16, 2007).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.0.0 (Mar. 2007).

NTT DOCOMO et al., "Operators' views on Mobility performance requirements for Home eNB," 3GPP TSG RAN WG2 #61bis, R2-081736, Shenzhen, China (Mar. 31-Apr. 4, 2008).

* cited by examiner

US 8,996,015 B2

METHOD AND APPARATUS FOR DETECTING AND MEASURING FOR HOME NODE-BS

CROSS REFERENCE TO RELATED APPLICATIONS

This application is a continuation of U.S. patent application Ser. No. 12/818,474 filed Jun. 18, 2010, which claims the benefit of U.S. provisional application No. 61/218,824 filed Jun. 19, 2009; U.S. provisional application No. 61/248,003 filed Oct. 2, 2009; U.S. provisional application No. 61/247, 968 filed Oct. 2, 2009; and U.S. provisional application No. 61/250,255 filed Oct. 9, 2009, the contents of which are hereby incorporated by reference herein.

FIELD OF INVENTION

This application is related to wireless communications.

BACKGROUND

Home Node-Bs (HNBs) for Universal Mobile Telecommunications System (UMTS) and Home e-Node-Bs (HeNBs) for Long Term Evolution (LTE) (collectively, "Home Node-Bs" (HNBs)), have been introduced in Release 8 of the 3rd Generation Partnership Project (3GPP) standard, for example, to increase cellular coverage and overall system throughput. HNBs are physical devices (e.g., similar to wireless local area network (WLAN) access points (APs)) that provide access to UMTS and/or LTE services over extremely small service areas (or cells), such as private homes, small offices and coffee shops. As opposed to WLAN APs, which are generally accessible by wireless devices within their ranges, access to HNBs may be limited to smaller, more select groups of users referred to as closed subscriber groups (CSGs). Similar to WLAN APs, however, HNBs connect their users' wireless devices to the HNB operator's core network. For HNBs, the connection may be established using, for example, an internet connection (e.g., a digital subscriber line (DSL)). By way of example, a coffee shop owner (or subscriber) may choose to deploy an HNB in his or her shop to provide patrons (the CSG in this example) with a stronger wireless connection than may otherwise be available inside the shop. Due to their use in small service areas, HNBs may be densely deployed and, accordingly, located within the coverage area of one or more macro Node-Bs.

To enable certain functionalities for wireless devices or wireless transmit/receive units (WTRUs), such as handover (HO) between network nodes, it may be necessary for the WTRU to perform measurements, for example, on other frequencies or systems. To perform these measurements, the WTRU may require gaps.

Inter-frequency measurement reporting rules do not cover scenarios where it may be preferable for the WTRU to handover from a macro cell frequency to an HNB frequency, even if the quality of the macro cell frequency is still acceptable. The network typically configures the WTRU for compressed mode with gaps to measure other frequencies when the WTRU is at the border of one or more cells and needs to handover to another frequency.

The inter-frequency measurement reporting rules rarely apply to HNBs, which may be, for example, deployed in private homes localized anywhere in the macro cell coverage area (as described above). Nevertheless, a user may prefer to handover from a macro cell to an HNB, even if the quality of the frequency of the serving macro cell is above a predetermined threshold. To handover the WTRU from a macro cell to an HNB, the network may need to configure the user's WTRU for compressed mode in order to detect the HNB primary scrambling codes (PSCs) (applicable to UMTS HNBs) or physical cell identities (PCIs) (applicable to LTE HNB) on other frequencies.

SUMMARY

Methods and apparatus for a wireless transmit/receive unit (WTRU) to detect and perform measurements with respect to Home Node-Bs (HNB) and Home evolved Node-Bs (H(e) NB) (collectively referred to as "HNB") on a frequency and other systems are disclosed. The methods may include generating and transmitting a request for a measurement configuration that may include a request for an allocation of gaps to detect and measure a primary scrambling code (PSC) or a physical cell identity (PCI) of a target HNB for at least one frequency or radio access technology. The request may be in response to the WTRU entering a HNB cell for which the WTRU has stored fingerprint information and whose closed subscriber group (CSG) ID is in the WTRU's whitelist. The request sent by the WTRU may include the frequency, fingerprint information, cell identification and other similar information. In addition, methods are described for releasing the measurement configuration including any gaps. The network may configure the WTRU to measure the requested frequency or RAT in response to the vicinity/proximity report/request.

BRIEF DESCRIPTION OF THE DRAWINGS

A more detailed understanding may be had from the following description, given by way of example in conjunction with the accompanying drawings wherein.

DETAILED DESCRIPTION

Figure 1:
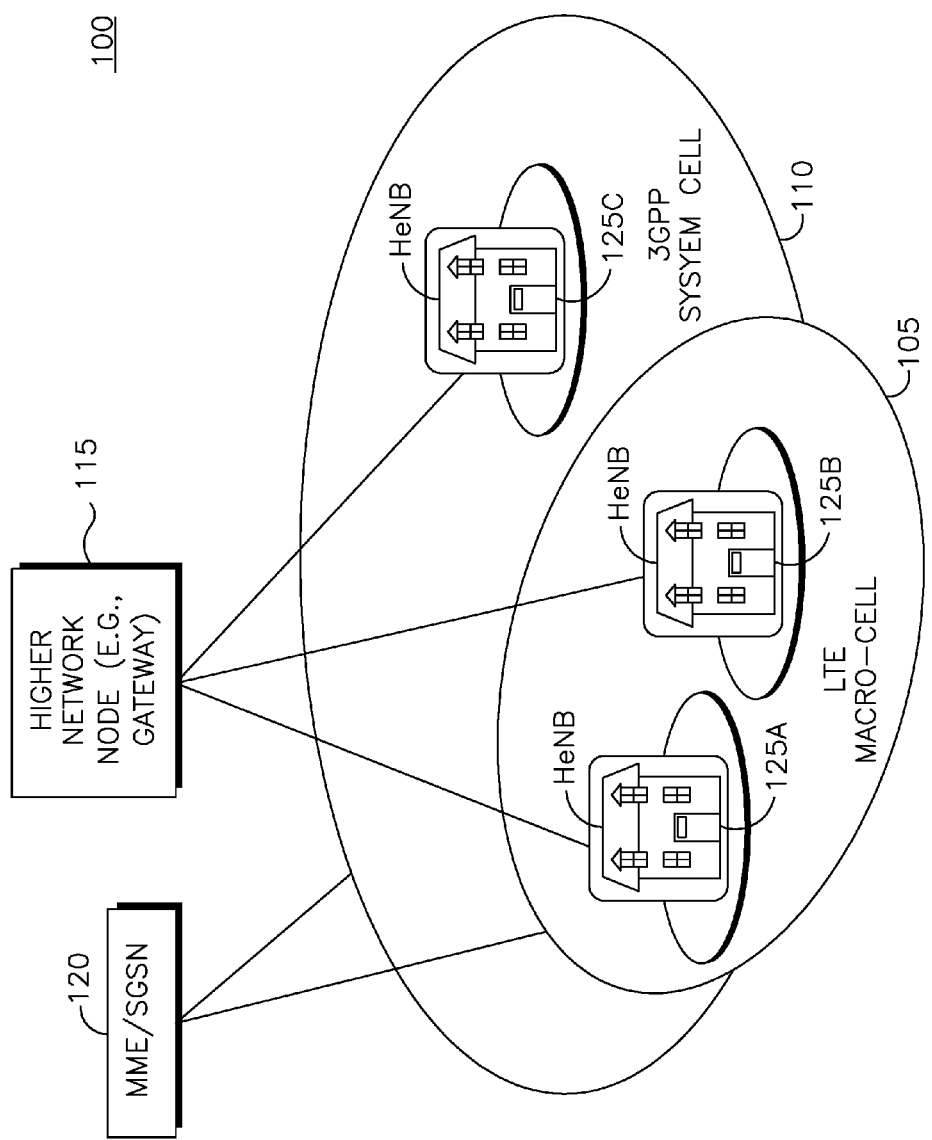
FIG. 1 is an example of a Home Node-B (HNB) or Home (evolved) Node-B (H(e)NB) (collectively referred to as HNB) deployment in a wireless communication system.

When referred to hereafter, the terminology "wireless transmit/receive unit (WTRU)" includes, but is not limited to, a user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology "base station" includes, but is not limited to, a Node-B, a site controller, an access point (AP), or any other type of interfacing device capable of operating in a wireless environment. A Home Node-Bs (HNBs) and Home e-Node-Bs (HeNBs) (collectively referred to as (HNBs)) may be a WTRU, a base station or a combination thereof.

HNBs have been introduced in long term evolution (LTE) and Universal Mobile Telecommunications System (UMTS), respectively, as part of an effort to provide improved spectral efficiency, reduced latency, and better utilization of radio resources for faster user experiences, richer applications and lower cost services. The HNB provides subscribers with access to network services over extremely small service areas, such as homes or small offices. A subscriber (e.g., an individual or an organization) may deploy a HNB over an area where such service is desired. In general, an HNB cell may be any cell that broadcasts a closed subscriber group (CSG) ID. The HNB cell may refer to a CSG cell or a hybrid cell. A CSG cell refers to a defined area over which radio coverage provided by the HNB may only be accessed by a group of subscribers authorized, via the CSG ID, to use the services of the cell. A hybrid cell refers to a cell that has a defined area over which radio coverage provided by the HNB corresponds to a CSG ID but which is accessible by non-member WTRUs. HNBs may be deployed on the same carrier as open or macro base stations and may also be deployed in a dedicated carrier. In general, a macro cell refers to a defined area over which radio coverage is provided by a base station (also referred to as a normal or open cell). In certain situations, the macro cell may also refer to a CSG cell.

Although the terminology used herein generally corresponds to Universal Mobile Telecommunications System (UMTS) technology, the concepts described herein are applicable to other wireless technologies such as LTE. Therefore, for example, if the term primary scrambling codes (PSC) is used herein, this may be considered as equivalent to physical cell identities (PCI) in LTE. Further, the terms compressed mode gaps and measurement gaps are used interchangeably herein and are collectively referred to hereafter as "gaps." These "gaps" refer to the gaps that the WTRU may require to perform measurements on at least one frequency and on other systems. Additionally, the gaps may correspond to compressed mode gaps for UMTS and measurement gaps for LTE. Even further, the term Cell Global Identity (CGI) may refer to the LTE CGI as well as to the UMTS Cell Identity (CI) broadcast in the system information of the cell.

To enable certain functionalities for wireless devices or wireless transmit/receive units (WTRUs), such as handover (HO) between network nodes, it may be necessary for the WTRU to perform measurements, for example, of cells on a certain frequency or systems. To perform these measurements, the WTRU may require a measurement configuration which may include a pattern in time during which the WTRU is allowed to interrupt reception on its serving cell for the purpose of performing measurements in the same or other frequencies and other radio access technologies (RATs). Such pattern may correspond to compressed mode gaps in UMTS, or measurement gaps in LTE, and will be referred to as "gaps" hereinafter.

Measurement configurations may include a number of measurement types such as inter-frequency measurements, intra-frequency measurements, and inter-RAT measurements which assist the network for handover (HO) purposes. For both UMTS and LTE, these measurement types are configured by the network, and the WTRU may measure on a certain frequency or radio access technology (RAT) if configured with such events. In some cases, in order to make measurements on at least one frequency or RAT, the network has to configure the WTRU with gaps. Some, inter-frequency measurement report events specified in the 3GPP standards for UMTS and LTE include (assuming single-radio implementation): Event 2a ("Change of best frequency"); Event 2b ("The estimated quality of the currently used frequency is below a certain threshold and the estimated quality of a non-used frequency is above a certain threshold"); Event 2c ("The estimated quality of a non-used frequency is above a certain threshold"); Event 2d ("The estimated quality of the currently used frequency is below a certain threshold"); Event 2e ("The estimated quality of a non-used frequency is below a certain threshold"); and Event 2f ("The estimated quality of the currently used frequency is above a certain threshold"). The measurements required to evaluate the criteria for these events may require the WTRU to be configured with gaps.

Measurements on at least one frequency or RAT may be power consuming and may result in some service degradation when gaps are required to take the measurements. Therefore, by default, wireless devices may not be configured to measure on at least one frequency or RAT. The network may rely on the reception of a measurement report (e.g., Event 2D), which indicates that the quality of the currently used frequency is below a threshold. In such a situation, the network may then configure the WTRU to start taking measurements on a frequency or RAT and may additionally configure the WTRU with gaps.

For LTE, the following events may be configured for an inter-frequency measurement type: Event A3 (Neighbor becomes amount of offset better than serving); Event A4 (Neighbor becomes better than absolute threshold); and Event A5 (Serving becomes worse than absolute threshold1 and Neighbor becomes better than another absolute threshold2). In a typical single-radio implementation, gaps may generally need to be configured to ensure a minimum time for the WTRU to perform measurements.

Existing measurement reporting rules do not cover scenarios where it may be preferable for the WTRU to handover from a macro cell frequency to an HNB frequency, even if the quality of the macro cell frequency is still acceptable. The network typically configures the WTRU to measure on another frequency or RAT when the WTRU is at the border of one or more cells and needs to handover to another cell, frequency or RAT. Given that for HNBs, the network is not aware of the deployment or whether a WTRU is allowed to connect to a HNB that is under the coverage of a macro cell, the network may not know when to configure the WTRU to perform HNB measurements on at least one frequency or RAT.

Disclosed herein are methods and apparatus for facilitating a wireless transmit/receive unit (WTRU) to detect HNBs, measure a frequency or RAT with respect to the HNB and release measurement configurations that may include gaps. The methods may include generating and transmitting a request for a measurement configuration that may include a request for an allocation of gaps to detect and measure a PSC or PCI of a target HNB for at least one frequency or RAT. The request may be in response to the WTRU entering the proximity or vicinity of a HNB cell for which the WTRU has stored fingerprint information (i.e., autonomous search functionality) and whose closed subscriber group (CSG) ID is in the WTRU's whitelist. This may be determined in WTRU by means of WTRU specific fingerprint information. The WTRU whitelist includes the CSG IDs of the HNBs the WTRU may be allowed to access. The request sent by the WTRU may include the frequency, RAT, cell identification and other similar information. The network may then configure the WTRU to measure the requested frequency or RAT in response to the vicinity/proximity report/request. In addition, methods are described for releasing the measurement configuration including gaps. The request for releasing measurement configuration may be in response to the WTRU leaving the vicinity of a HNB cell whose CSG ID is in the WTRU's whitelist, in accordance with stored fingerprint information (i.e. an autonomous search functionality).

It is understood that the methods disclosed herein are applicable and may be configured for inter-frequency, inter-radio access technology (RAT) and intra-frequency measurements of HNB cells or frequencies.

FIG. 1 shows an example of a HNB deployment in a wireless communication system 100. The wireless communication system 100 includes an LTE open-cell 105, a 3GPP system cell 110, a higher network node (e.g., gateway) 115 and/or a mobility management entity (MME)/serving general packet radio service (GPRS) support node (SGSN) 120. The higher network node 115 is responsible for coordinating the operation of several HNBs 125A, 125B and 125C. Alternatively, the MME/SGSN 120 may be responsible for coordinating the operation of several HNBs 125A, 125B and 125C. The MME is the LTE equivalent of a 3G/2G SGSN/GGSN. The relationship between the LTE open-cell 105 and other 3GPP systems 110, (e.g., WCDMA/global system for mobile communications (GSM)), is that there may be areas where the coverage of these two technologies overlap. It is similar to simultaneous coverage of GSM and WCDMA technologies. The higher network node 115 may be a gateway function which interfaces with the MME/SGSN 120. As a gateway, the role of the higher network node 115 may be to act as a single open-cell towards the MME/SGSN 120 while supporting several small home cells or CSG cells.

Figure 2:
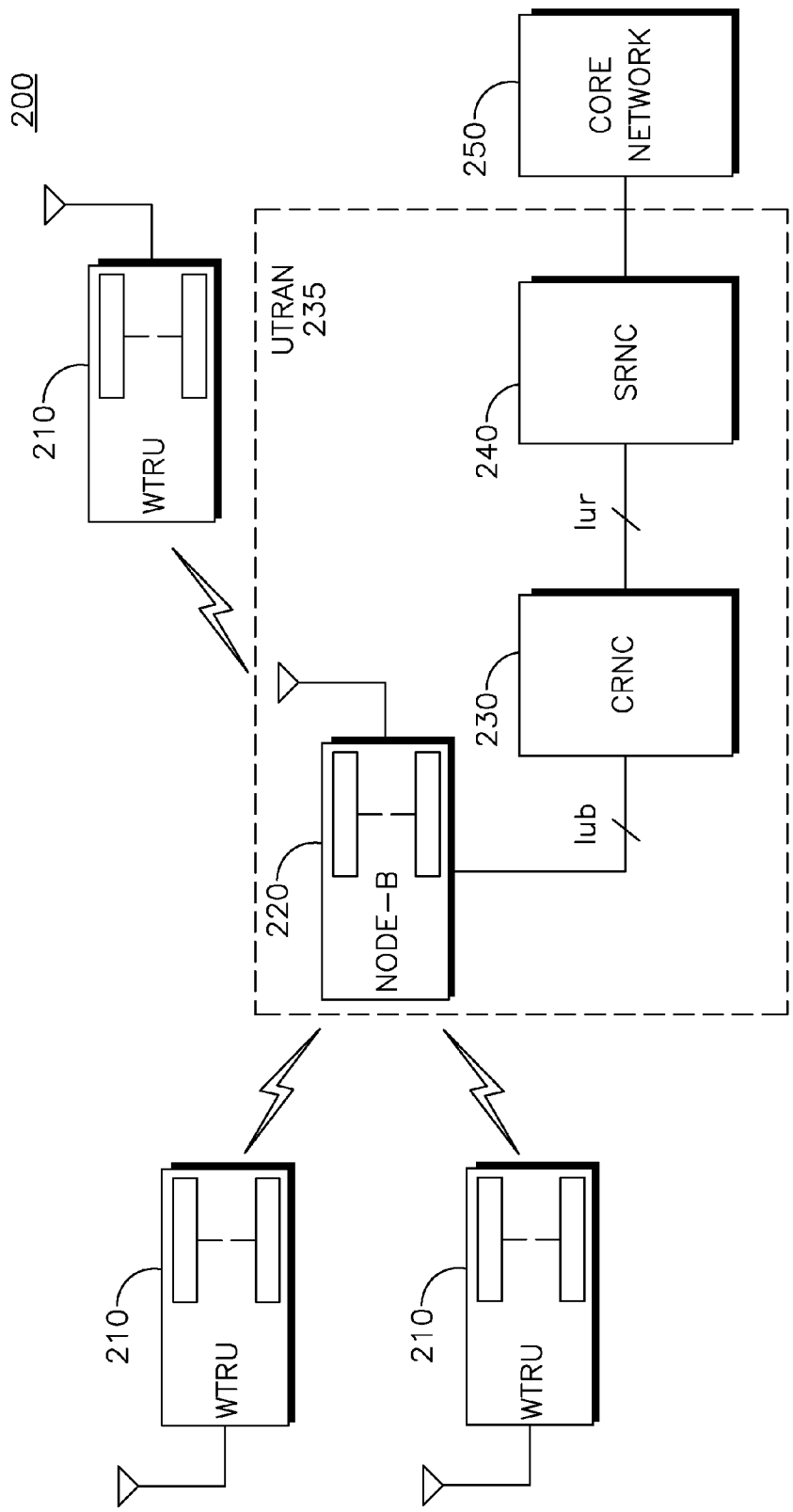
FIG. 2 is an example of a wireless communication system that may be used with the system of FIG. 1.

FIG. 2 is a block diagram of an example wireless communication system 200 that works with system 100 and may include a plurality of WTRUs 210, a Node-B 220, a controlling radio network controller (CRNC) 230, a serving radio network controller (SRNC) 240, and a core network 250. The Node-B 220 and the CRNC 230 may collectively be referred to as the Universal Terrestrial Radio Access Network (UTRAN) 235.

The WTRUs 210 illustrated in FIG. 2 are in communication with the Node-B 220, which is in communication with the CRNC 230 and the SRNC 240. Although three WTRUs 210, one Node-B 220, one CRNC 230, and one SRNC 240 are shown as included in the example system 200 of FIG. 2, any combination of wireless and wired devices may be included in a wireless communication system.

Figure 3:
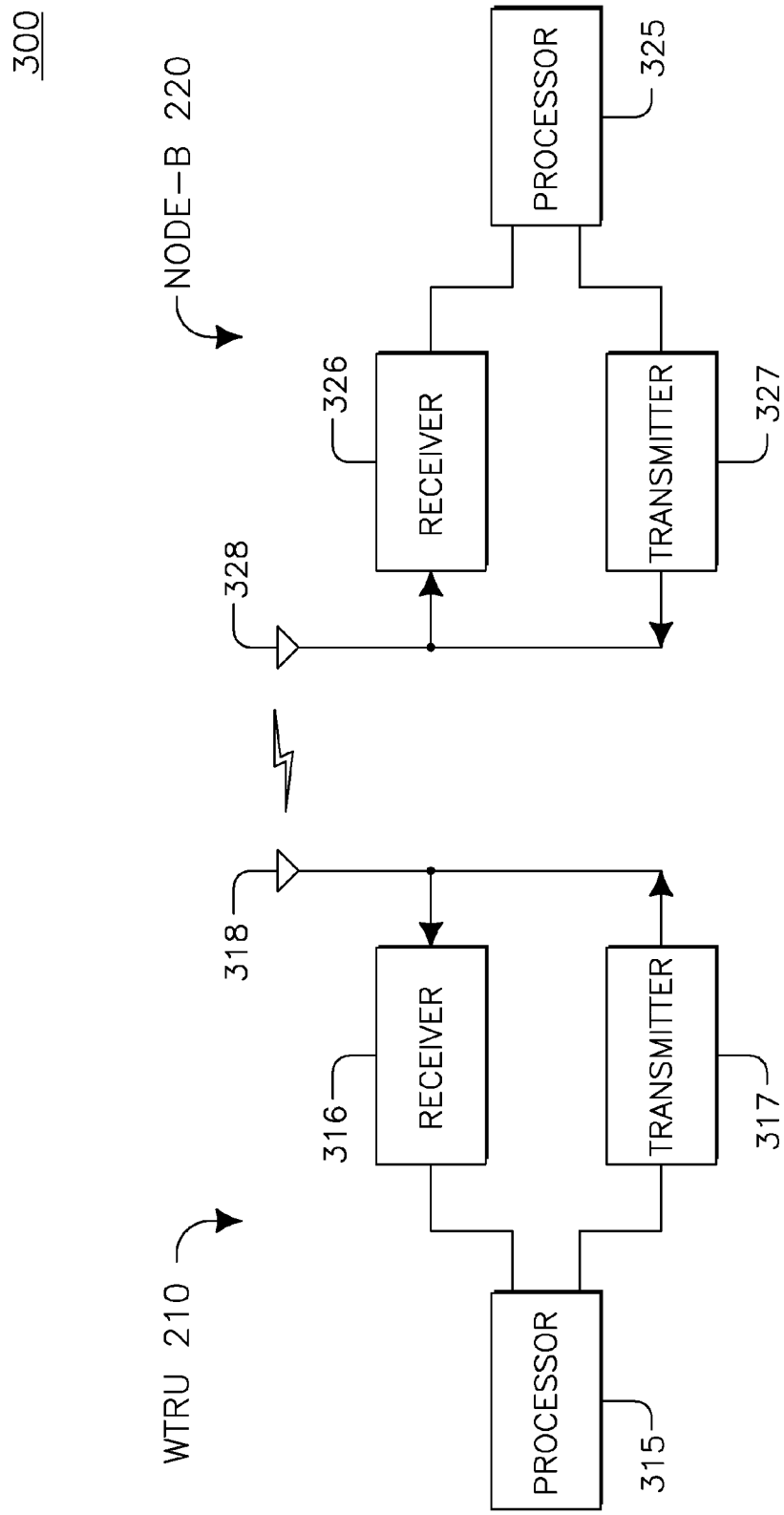
FIG. 3 is an example functional block diagram of a wireless transmit/receive unit (WTRU) and the Node-B of the wireless communication system of FIG. 2.

FIG. 3 is a functional block diagram 300 of one of the WTRUs 210 and the Node-B 220 of the example wireless communication system 200 of FIG. 2. In general, the WTRU 210 illustrated in FIG. 3 is in communication with the Node-B 220, and both the WTRU 210 and the Node-B 220 are configured to detect HNBs, receive configuration information, measure at least one frequency or RAT with respect to the HNB and release measurement configurations that may include gaps with respect to a WTRU entering or exiting a HNB cell. In the UMTS architecture, the SRNC sends the configuration information and processes the measurements.

In addition to the components that may be found in a typical WTRU, the example WTRU 210 includes a processor 315, a receiver 316, a transmitter 317, a memory (not shown) and an antenna 318. The memory may be provided to store software including, for example, an operating system, application, and other such software. The processor 315 may be configured to, alone or in association with the software, detect HNBs, receive configuration information, measure at least one frequency or RAT with respect to the HNB and release measurement configurations that may include gaps with respect to a WTRU entering or exiting a HNB cell. The receiver 316 and the transmitter 317 are in communication with the processor 315. The antenna 318 is in communication with both the receiver 316 and the transmitter 317 to facilitate transmission and reception of wireless data.

In addition to the components that may be found in a typical base station, the Node-B 220 includes a processor 325, a receiver 326, a transmitter 327, and an antenna 328. The processor 325 may be configured to, alone or in association with the software, detect HNBs, detect entering or leaving the vicinity/proximity of a HNB, receive configuration information that may include gaps, measure at least one frequency or RAT with respect to the HNB and release measurement configurations that may include gaps with respect to a WTRU entering or exiting the vicinity/proximity of a HNB cell. The receiver 326 and the transmitter 327 are in communication with the processor 325. The antenna 328 is in communication with both the receiver 326 and the transmitter 327 to facilitate the transmission and reception of wireless data. In the UMTS architecture, the SRNC sends the configuration information and processes the measurements.

Figure 4:
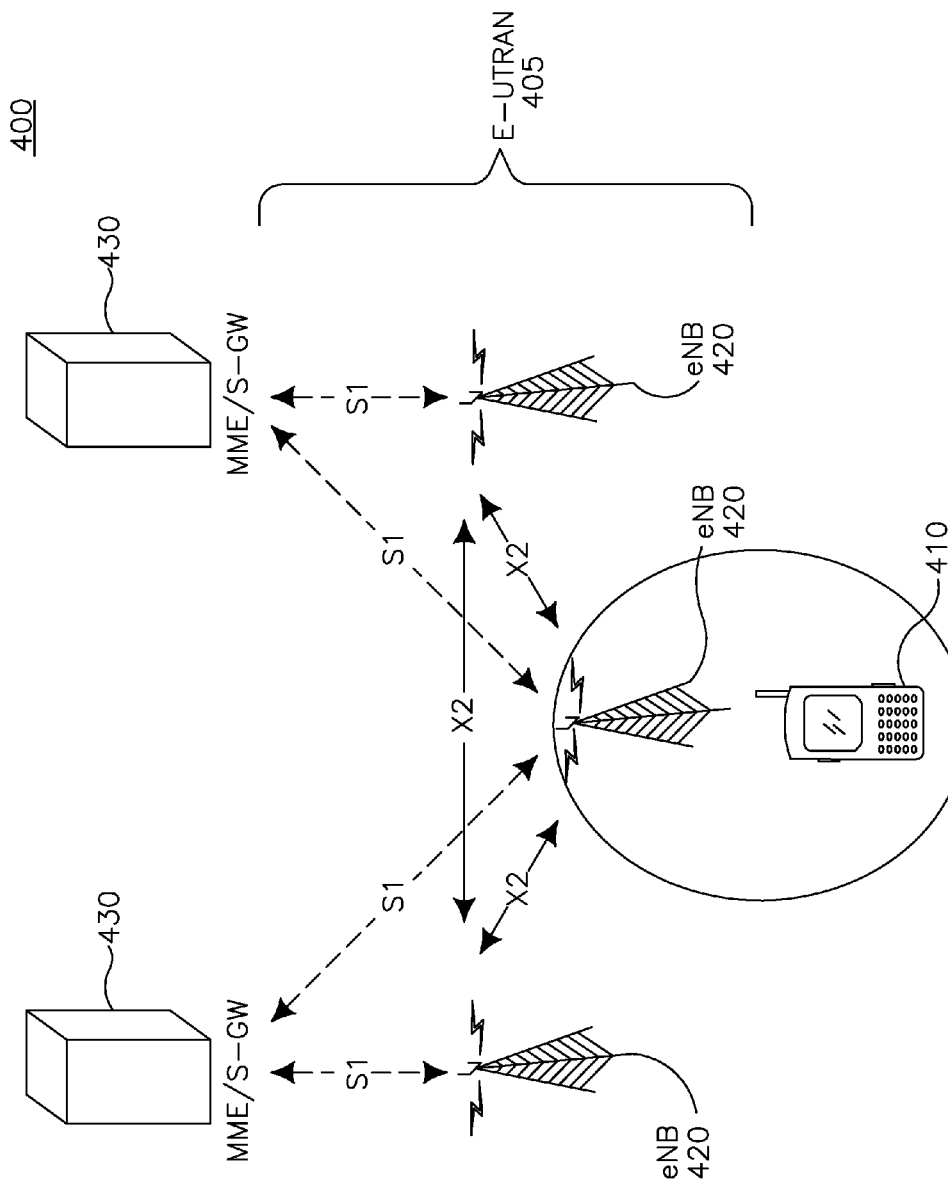
FIG. 4 is another example of a wireless communication system that may be used with the system of FIG. 1.

FIG. 4 shows a Long Term Evolution (LTE) wireless communication system/access network 400 that may work in system 100 and may include an Evolved-Universal Terrestrial Radio Access Network (E-UTRAN) 405. The E-UTRAN 405 includes several evolved Node-Bs, (eNBs) 420. The WTRU 410 is in communication with an eNB 420. The eNBs 420 interface with each other using an X2 interface. Each of the eNBs 420 interface with a Mobility Management Entity (MME)/Serving GateWay (S-GW) 430 through an S1 interface. Although a single WTRU 410 and three eNBs 420 are shown in FIG. 4, it should be apparent that any combination of wireless and wired devices may be included in the wireless communication system access network 400.

Figure 5:
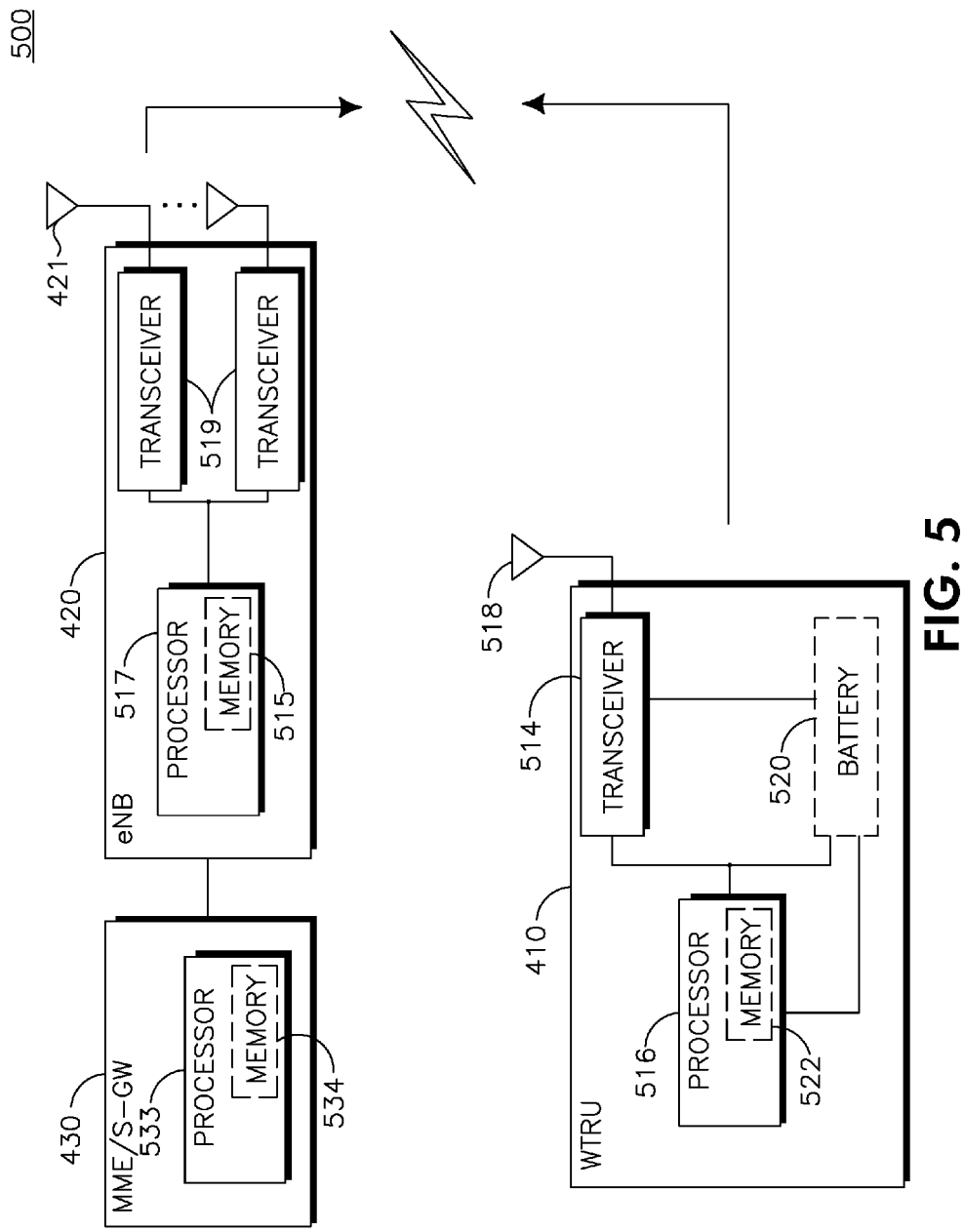
FIG. 5 is an example functional block diagram of a WTRU and the Node-B of the wireless communication system of FIG. 4.

FIG. 5 is an example block diagram of an LTE wireless communication system 500 including the WTRU 410, the eNB 420, and the MME/S-GW 430. As shown in FIG. 5, the WTRU 410, the eNB 420 and the MME/S-GW 430 are configured to detect HNBs, detect entering or leaving the vicinity/proximity of a HNB, receive configuration information that may include gaps, measure at least one frequency or RAT with respect to the HNB and release measurement configurations that may include gaps with respect to a WTRU entering or exiting the vicinity/proximity of a HNB cell.

In addition to the components that may be found in a typical WTRU, the WTRU 410 includes a processor 516 with an optional linked memory 522, at least one transceiver 514, an optional battery 520, and an antenna 518. The processor 516 is configured to detect HNBs, detect entering or leaving the vicinity/proximity of a HNB, receive configuration information that may include gaps, measure at least one frequency or RAT with respect to the HNB and release measurement configurations that may include gaps with respect to a WTRU entering or exiting the vicinity/proximity of a HNB cell. The transceiver 514 is in communication with the processor 516 and the antenna 518 to facilitate the transmission and reception of wireless communications. In case a battery 520 is used in the WTRU 410, it powers the transceiver 514 and the processor 516.

In addition to the components that may be found in a typical eNB, the eNB 420 includes a processor 517 with an optional linked memory 515, transceivers 519, and antennas 521. The processor 517 is configured to detect HNBs, detect entering or leaving the vicinity/proximity of a HNB, receive configuration information that may include gaps, measure at least one frequency or RAT with respect to the HNB and release measurement configurations that may include gaps with respect to a WTRU entering or exiting the vicinity/ proximity of a HNB cell. The transceivers 519 are in communication with the processor 517 and antennas 521 to facilitate the transmission and reception of wireless communications. The eNB 520 is connected to the Mobility Management Entity/Serving GateWay (MME/S-GW) 530 which includes a processor 533 with an optional linked memory 534.

Figure 6:
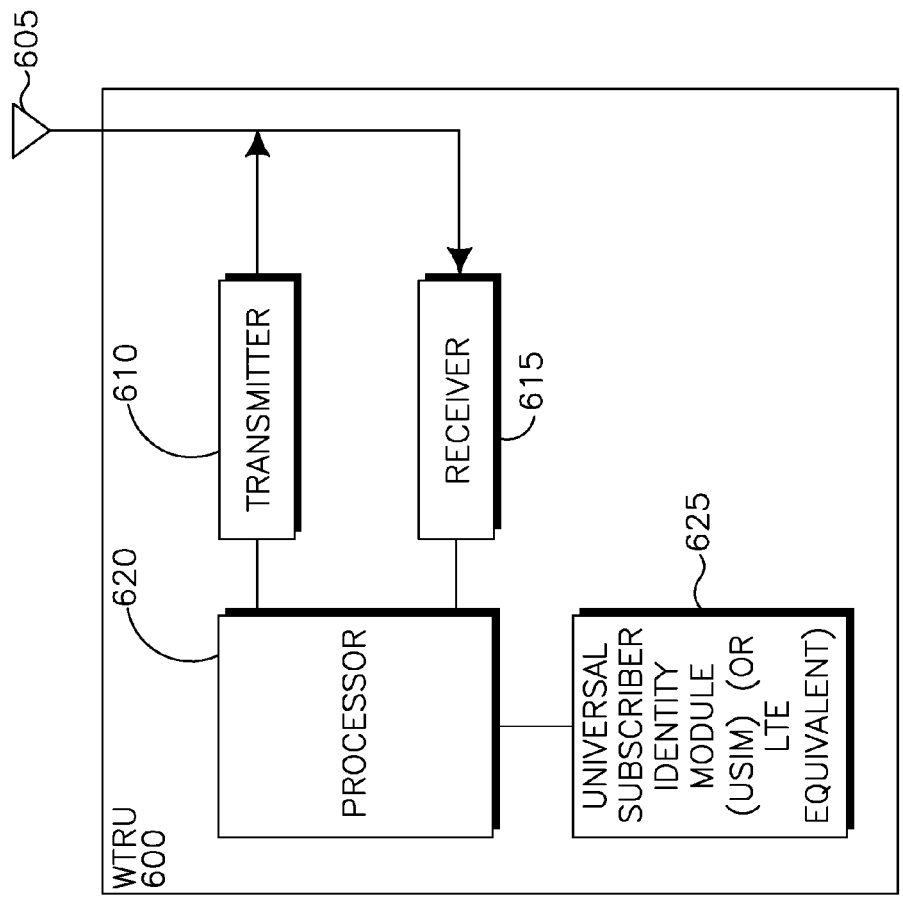
FIG. 6 is an example functional block diagram of another WTRU of the wireless communication system of FIGS. 2 and 4.

FIG. 6 is an example block diagram of a WTRU 600 that is configured according to the embodiments disclosed herein. In addition to the components that may be found in a typical WTRU, the WTRU 600 includes an antenna 605, a transmitter 610, a receiver 615, a processor 620 and a universal subscriber identity module (USIM) (or LTE equivalent) 625. The receiver 615 is configured to receive a broadcast via the antenna 605 from a cell including a cell ID. The processor 620 is electrically coupled to the transmitter 610, the receiver 615 and the USIM (or LTE equivalent) 625. The processor 620 is configured to detect HNBs, detect entering or leaving the vicinity/proximity of a HNB, receive configuration information that may include gaps, measure at least one frequency or RAT with respect to the HNB and release measurement configurations that may include gaps with respect to a WTRU entering or exiting the vicinity/proximity of a HNB cell.

Various embodiments are described herein to detect HNBs, receive configuration information, measure at least one frequency or RAT with respect to the HNB and release measurement configurations that may include gaps with respect to a WTRU entering or exiting a HNB cell. Such embodiments may include, for example, methods that the WTRU may use to request a measurement configuration that may include a request for an allocation of gaps so that it may detect the PSC or PCI of an HNB in its neighborhood and/or measure its PSC or PCI on other frequencies. Embodiments for releasing the measurement configuration in addition to any gaps are also provided.

With respect to the various embodiments, two different scenarios may be considered. In a first scenario, the WTRU visits a certain HNB for the first time. In a second scenario, the WTRU subsequently encounters the same HNB (after the initial encounter). In the second scenario, the WTRU has already stored fingerprint information identifying the approximate location of an allowed HNB (e.g. a CSG that is in the whitelist of the WTRU) and may use it to determine if the WTRU is in the vicinity of an allowed HNB. Based on the outcome of the determination, the WTRU may know whether to measure at least one frequency or RAT. The terms vicinity and proximity may be used interchangeably herein.

In one embodiment, when such a determination is made, the WTRU may send a request (e.g., a report) to the network notifying the network of the vicinity of this HNB. This may be use to send a request (e.g., a report) to the network to perform measurements of CSG cells in the neighborhood or in the vicinity of a given frequency or RAT. In order to allow the WTRU to request such measurement configurations, new measurement report types (such as for inter-frequency or inter-RAT) or events may be introduced. In one option, the WTRU may introduce two events. One example of an event or measurement type may, for example, be for the first scenario where the WTRU is in the vicinity of an inter-frequency HNB for the first time and, as a consequence, does not have a stored fingerprint for the HNB. Another example event or type may, for example, be for the second scenario, where the WTRU is aware that an allowed neighboring HNB is present in a frequency or RAT due to stored fingerprint information.

For instance, in the first scenario, where the WTRU does not have the capability to determine whether it is within the coverage of an allowed HNB or not, the WTRU may introduce a new event or report with the description "Request for gaps for detecting inter-frequency HNBs." For example, in UMTS, this event may be called event 2g. For LTE, the event may be called event A6. Although this event is referred to as event 2g or A6, it may take any other number, name or type. Although the term "Request for gaps . . . " is used in the example, it may alternatively be a "Request for measurement configuration . . . " or "Request for measurement configuration and gaps . . . "

This new event/report may be triggered as a result of the initiation of a manual HNB search, which may now be allowed in connected mode. Because the WTRU is in connected mode (e.g., CELL_DCH), it cannot measure a frequency without service interruption. Therefore, once a manual search is initiated, the WTRU may trigger event 2g to indicate to the network that it would like to measure an HNB frequency (if the network had previously configured the WTRU with a measurement command for this event). The network may then configure the WTRU with gaps, and, accordingly, the WTRU may detect the HNB PSC (or PCI) on at least one frequency (if any are available). Although the CELL_DCH is shown as an illustrative state, the methods and apparatus described herein are also applicable to WTRUs in the CELL_FACH state.

The event 2g may be triggered in other ways in addition to being triggered by a manual search. For example, the event 2g may also be triggered by a location-type detection when the WTRU is equipped with a GPS. For example, if the WTRU detects that it entered a city area (or any specific preferred HNB area); it may send an event 2g to the network. Otherwise, no event is triggered. By way of another example, the event 2g may be triggered by a periodic search for HNBs defined in the WTRU (e.g., upon expiration of a timer). The duration of this timer may be fixed or configurable by the network or a user. According to this example, once the timer expires, the WTRU is triggered to perform an HNB search in the current frequency (and, optionally, in at least one frequency and system). The event for requesting gaps may also be triggered if the WTRU detects that a desired PSC or PCI (or alternatively HNB) is in a neighboring list provided to the WTRU.

It may also be possible for the WTRU to perform measurements on the HNB frequency without using any measurement or compressed mode gap. This may occur when, for example, the WTRU is configured with Continuous Packet Connectivity (CPC) Discontinuous reception (DRX) (for UMTS) in CELL_DCH or with DRX in LTE and there is little traffic activity. In this example embodiment, event 2f or 2g may optionally be triggered only if the WTRU does not detect the PSC or PCI of the HNB after a timer expires (e.g., the timer may have been started responsive to the manual search request or detection of a matching fingerprint). Such a timer may be stopped if/when the WTRU detects the PSC or PCI of the HNB (e.g., due to DRX opportunities). In another option, the timer may also be stopped after a pre-defined or pre-signaled inter-frequency measurement duration (performed during DRX opportunities) has elapsed.

Optionally, as part of the new measurement event, the WTRU may indicate the reason why it was triggered, such as manual search, periodic search by the WTRU, location and the PSC/PSI in neighboring list. The neighboring list may be provided by the network and includes the PSCs/PSIs of the cells located in the neighborhood of the WTRU. As stated above, the whitelist may contain the CSG IDs of the HNBs the WTRU may be allowed to access. A neighbor cell may or may not have its CSG ID as part of the WTRU whitelist.

In the second scenario, if the WTRU detects, using stored fingerprint information, that at least one of the HNBs with a CSG ID stored in its Universal Subscriber Identity Module (USIM) or whitelist may potentially be using a same of different frequency or different RAT than the serving macro cell and is close to its current location (in the proximity of the macro cell), the WTRU may introduce, trigger and send to the network a new event/report/message indicating that a CSG is in the proximity (e.g., the WTRU is entering an area in which a CSG whose CSG identity is in the WTRU's whitelist may be available). Upon reception of this report, the network may configure the WTRU for measurements, optionally using gaps, so that the WTRU may measure the PSCs or PCIs corresponding to the HNBs on the applicable frequency(ies).

The new report may correspond to a new event within an existing measurement type (e.g., inter-frequency type, group 2x or Ax) and may be called, for example, event 2h for UMTS and A7 for LTE and may be entitled "One or several HNBs on a different frequency match the current WTRU location." Alternatively, the same event/report may be used for both the first and second scenarios described above. The event may, for instance, be consolidated in one event (e.g., event 2g for UMTS and A6 for LTE). The event may be triggered based on any of the individual or combined conditions described above.

In another embodiment, the WTRU may use an existing event to report a preference to measure a neighboring HNB in a frequency, even if the estimated quality of the currently used frequency is above a certain threshold. This may be achieved for UMTS, for example, by extending an existing event, such as event 2f. Extending the event may be performed, for example, by adding a one bit information element (IE) (such as a flag) indicating that the event was triggered for HNB and that the WTRU may like to measure an HNB on a different frequency or system. For UMTS, the additional IE may be added in any IE, such as measurement report structures, event results, Inter-Frequency event results and extensions to sub-IEs containing event 2f information. For LTE, the additional IE may be added, for example, as a non-critical extension of the MeasurementReport message or of the measResults IE.

In another embodiment, the WTRU may use a new type of measurement group to notify the network about HNB related events as described herein. These HNB events within a new measurement type may, for example, be referred/configured as measurement type 8, and be referred to as CSG reporting type. For example, 8x events for UMTS and Cx events for LTE may be defined. These new measurement types may be used for frequency or RAT measurements. For example, the WTRU may use new event 8a ("request of gaps for detecting inter-frequency PSC") to request gaps. Alternatively, the WTRU may introduce two new events such as, for example, 8a and 8b. One of the new events may be used for the first scenario where the WTRU has no fingerprint information, and the other may be used for the second scenario where the WTRU has fingerprint information (similar to 2g and 2h, for example). Two separate events may be defined for inter-frequency and inter-RAT requests for PSC detection. Alternatively, one event or measurement type may be used for both frequency and RAT requests. This common measurement type is used by the WTRU to report to the network that it has detected that an allowed CSG is in the vicinity of the current location.

Alternatively, a new Radio Resource Control (RRC) message may be defined via which the WTRU may use to report CSGs in the vicinity. This new message may carry the same information described above for the other embodiments.

While the above embodiments are described in the context of inter-frequency measurements, they are equally applicable for requesting gaps to detect HNBs for the inter-RAT scenarios as well (e.g., if the WTRU attempts to measure and handover from a UMTS macro cell to an LTE HeNB) and intra-frequency scenarios. It should also be understood that the triggering criteria may be similar to the inter-frequency scenario. In the inter-RAT case, a new inter-RAT event may be added (e.g., event 3e for UMTS and B3 for LTE, "Request of gaps for detecting HNBs on another system"). Alternatively, a new event from the new HNB events may be defined (e.g., 8x for UMTS or Cx for LTE, "Request of gaps for detecting other system's HNBs"). An existing 3x event may alternatively be reused as described herein.

The new event/report as part of the new measurement type, 8 may be the same one used for the inter-frequency case. For example, one event 8a or one report may be used for "Request of gaps for detecting HNBs" or (using the same terminology as above), "One or several HNBs match the current WTRU location". In this case, once the event/report is triggered, it may also contain an optional information element indicating whether the WTRU wishes to perform measurements on inter-frequency, inter-RAT, or both.

In general, the network may use the information provided by the WTRU to determine whether measurement configurations that may include gaps should be allocated and also the duration of the gaps, if needed. The duration of the gaps, for example, may depend on the number of frequencies the WTRU has to measure.

Optionally, a new IE may be added in the report to indicate the reason why the event report was triggered. This may include, by way of non-limiting example, one, or a combination of, a manual search, a periodic search by the WTRU, a location, a fingerprint matches the fingerprint of at least one HNB stored in the WTRU whitelist, and a PSC is in a neighbor list. This may be combined with any of the embodiments described herein.

In another embodiment for triggering proximity indication reporting, a LTE macro cell connection may have a higher priority than the UMTS HNB. Although described with respect to a LTE macro cell and an UMTS HNB, the description herein is applicable to other RAT combinations of macro cells and HNBs. In this embodiment, if a WTRU is connected to a LTE macro cell and it detects by means of its stored fingerprint information that it is close to a UMTS HNB that it is a member of, the WTRU does not necessarily trigger an autonomous search, (i.e., it does not send a HNB proximity indication to the network). The autonomous search may be initiated in such circumstances, only if the LTE macro cell channel conditions are deteriorating (i.e. the channel quality falls below a given threshold). The conditions to trigger a search and a measurement report to indicate a proximity indication may occur if 1) the current macro serving cell is LTE; 2) one of the WTRUs stored fingerprints matches a UMTS HNB (i.e., a UMTS HNB is in the WTRU's proximity); and 3) the macro serving cell quality is below a certain threshold. This threshold may be configured by the network, may be a fixed value used by the WTRU or may be determined by the WTRU. It may be a common value or a value per cell.

If these conditions are met, then the WTRU may send a measurement report to the network in order to request a measurement configuration that may include gaps for detecting the PSC and acquiring a master information block (MIB) (with optionally a Scheduling Block and a system information block 3 (SIB3) of the UMTS HNB. If conditions 1 and 2 are fulfilled and condition 3 is not, the WTRU may not send any report to the network to trigger the HNB measurements.

Optionally, the WTRU may still autonomously measure the channel quality of the PSC of the UMTS HNB that is in the WTRU's proximity and trigger the search if the PSC of the UMTS HNB is above a threshold. This option may be for a configured period of time. This trigger may be used in combination with the other triggers described herein.

Described now are examples for the information contained in the report.

Optionally, as part of the report, additional information may be reported to the network (if available to the WTRU), including, by way of non-limiting example, one, or a combination of, the known frequency of the HNB(s) which triggered the proximity report and whose CSG is stored on the whitelist of the WTRU, and/or the known RAT of the CSG(s) cell which triggered the report (e.g., LTE or UMTS).

The WTRU may optionally also include the following information pertaining to the CSG(s) which triggered the report such as, the known HNB's PSCs/PSIs of the CSG(s) cells stored on the whitelist of the WTRU, and the WTRU CSG IDs part of the whitelist. The WTRU may also include a CGI in the report sent to the network. Such additional information may be useful to the WTRU for detecting a "false" fingerprint match (e.g., where the WTRU determines that an HNB included in its whitelist is in its vicinity, but this is not actually the case). In this example, if the eNB or RNC receives a CGI in the gap request report, it may verify that an HNB with the corresponding CGI actually exists. If, however, it does not recognize the CGI, the eNB or RNC may decide to not configure the WTRU with a measurement configuration. Accordingly, if the WTRU does not receive a gaps configuration (or other measurement configuration) from the network within a certain period of time after requesting the network to configure it for measurement and/or gaps, the WTRU may decide to delete the corresponding fingerprint from its memory to avoid unnecessary gaps requests in the future. Alternatively, or in addition, the network (e.g., the eNB or the RNC) may explicitly indicate to the WTRU that a cell having a CGI corresponding to the CGI that the WTRU reported does not exist. Using this information, the WTRU may then delete the corresponding fingerprint as in the previous example. The network may also use the CSG ID information (if provided by the WTRU) for a similar purpose.

Optionally, in a deployment where the network is aware of all CSG cell frequencies in the vicinity and realizes that no CSG cell corresponding to the CSG cell reported by the WTRU as part of its whitelist is available, the network may not allocate any gaps. Instead, the network may, optionally, send an RRC message (for example, a measurement control) back to the WTRU indicating that no such CSG cell is available and that the WTRU does not have to measure inter-frequency HNBs. The WTRU may then update its HNB fingerprints accordingly.

Optionally, together with the proximity indicator, the WTRU may signal that a given HNB that is in the WTRU's proximity has priority. This may assist the network in allowing the WTRU to measure the HNB and potentially providing a measurement configuration that may include gaps.

The network may need to explicitly release measurement configurations or gaps that it allocated to allow the WTRU to detect HNB PSCs/PCIs on a frequency or RAT in case, for example, no handover occurs. Different causes may trigger the interruption/release of the measurement configuration which may have included gaps, such as, for example: the WTRU did not detect (and therefore did not report to the network) an HNB PSC after a certain period of time; the quality of the detected HNBs in a frequency or other system is below a certain threshold; the WTRU only detected HNB PSCs that are not on its whitelist; the WTRU detected that it is leaving the vicinity of its allowed HNBs (e.g., a HNB whose CSG is in the WTRU's whitelist) using its stored HNB fingerprints (e.g., there is no longer a matching fingerprint); the WTRU measured, but did not find, any HNBs with the CSG IDs in its whitelist; and no acceptable HNBs were detected.

The network or the WTRU may trigger release of the gaps. For example, if the network does not receive any HNB PSCs reported by the WTRU after a certain period of time, it may reconfigure the WTRU for deactivating the gaps. Alternatively, if the network knows the WTRU's location and realizes that no inter-frequency HNB is located in the WTRU's neighborhood, it may also release the gaps in the WTRU. The WTRU may release the gaps according to any of the following embodiments.

In one embodiment, the WTRU may notify the network that it no longer requires a measurement configuration (e.g., notify the network that it is leaving the area where there might be an allowed CSG cell). Upon reception of this notification, the network may reconfigure the WTRU to remove the measurement configuration, and optionally the gaps for the WTRU. When referred to hereafter, releasing the gaps refers to releasing the measurement configuration for CSG cells, or removing the configuration.

This notification/report may be sent via a new inter-frequency event. For example, for UMTS it may be type 2i, "Request for releasing the gaps allocated for detecting inter-frequency HNB".

Alternatively, the WTRU may use the new measurement type for CSG reports, e.g., 8. A new event/cause for reporting this event may be defined. As an example this may be called event 8b (or C2) "Request for releasing gaps for detecting inter-frequency HNB," to ask the network to release gaps (e.g., 8x for UMTS or Cx for LTE as described in the previous section). It is understood that the naming of events/trigger causes are illustrative and any names or descriptors may be used. For example, when the trigger corresponds to "the WTRU detected that it is leaving the vicinity of its allowed HNBs (e.g., a HNB whose CSG is in the WTRU's whitelist)", then the WTRU cause may be referred to as "the WTRU is leaving the CSG area".

In another embodiment, the WTRU may release the gaps autonomously, without waiting for a reconfiguration message from the network after it detects that it no longer needs to measure inter-frequency HNBs. The WTRU may also notify the network that it has released the gaps with a new event, such as event 2j for UMTS, "Gaps allocated for detecting inter-frequency HNB have been released." Alternatively, the WTRU may use an HNB event type, for example, 8x for UMTS or Cx for LTE, as described herein. The new event may be called, for example, 8c (or C3) "Gaps for detecting inter-frequency PSC have been released."

In another embodiment, the WTRU may re-use an existing measurement report event type and add to it a new IE to inform the network that the gaps previously allocated for detecting HNBs on other frequencies have to be released. Alternatively, this new IE may indicate to the network that the WTRU has autonomously released its gaps. For example, for UMTS, the event 2f may be modified as such with a new optional IE of type enumeration indicating one of a request for releasing gaps allocated for detecting inter-frequency HNB or a notification that the WTRU has released the gaps allocated for detecting inter-frequency HNB.

The WTRU may add an IE in the measurement report describing why it released the gaps. The IE may indicate, for example, that the Inter-frequency HNB search timer has elapsed or that the stored HNB fingerprint does not match.

Alternatively, a new RRC message may be defined and used by the WTRU to request or notify the network that one of the triggers described above has been met. For the trigger, wherein the WTRU detected that it is leaving the vicinity of its allowed HNBs (e.g., a HNB whose CSG is in the WTRU's whitelist), the new RRC message used indicates to the network that the WTRU is leaving the area. This new message may carry the same information as described above for the other embodiments. This RRC message may be a new message or the same RRC message used to indicate the request for initial measurements (e.g. when the WTRU enters the vicinity of a CSG cell).

The embodiments described herein for releasing the measurement configuration and any gaps previously allocated for detecting inter-frequency HNBs, may also be used for the inter-RAT (IRAT) scenario as well. For example, the WTRU may try to handover from a UMTS macro cell to an LTE HeNB. In the IRAT case, a new IRAT event may be added. For instance, event 3f for UMTS and event B4 for LTE, "Request for releasing gaps allocated for detecting HNBs of other system," may be added or a new event from the new HNB events 8c "Request for releasing gaps allocated for measuring other system" may be defined. Alternatively, a common event may be used as 8x (e.g., 8b) to notify the network that the measurement configuration and any gaps may no longer be needed. The common event may be used for both inter-frequency and inter-RAT measurement configuration and gap release when a WTRU leaves a HNB cell.

Optionally, the gaps may also be released once a handover to a HNB occurs.

Although the CELL_DCH is shown as an illustrative state, the methods and apparatus described herein are also applicable to WTRUs in the CELL_FACH state. In other connected mode states, such as CELL_FACH states, similar messages as the ones described for CELL_DCH may be used to notify the network.

It is understood that these methods are also applicable to other connected mode states such as CELL_FACH, even though CELL_DCH messages are shown above as illustrative states. The messages used to notify the network as described herein for CELL_FACH state may be similar to the ones described above or optionally, in the CELL_FACH state the WTRU may use messages such as CELL UPDATE to notify the network. A new cause or information element may be used by the WTRU to indicate the reason why a CELL UPDATE Message is being sent (e.g., entering or leaving the vicinity of a HNB).

One or a combination of the following example methods may be implemented in order to prevent the WTRU from requesting gaps too frequently.

In an example method, the WTRU may not be allowed to request gaps for detecting HNB PSC/PCI more than a certain number of times during a certain period of time. The periodicity (e.g., number of times and period of time) may be signaled by the network, may be part of the broadcast information, or stored in the WTRU. Optionally, this periodicity may differ per HNB. For example, the periodicity may be high for the user's home HNB, while low for other HNBs. This periodicity may also depend on the user's mobility.

In another example method, the network may be aware that there are no HNBs in the WTRU's vicinity and may indicate to the WTRU in an existing signal (e.g. new IE added in measurement control) that it is not allowed to request gaps (or triggering proximity reports) for detecting an HNB PSC/PCI.

In another example method, the network may indicate to the WTRU in an existing signal that only gap requests based on fingerprint matches are allowed and that periodic requests are forbidden.

In another example method, the fingerprint information in the WTRU may be maintained to make sure it is valid when the WTRU uses it to request gaps (i.e., to make sure there is an allowed HNB in the WTRU's neighborhood). This may be implemented using one or a combination of the following methods.

In one example implementation, a validity timer per HNB fingerprint may be started when the fingerprint is stored in the WTRU. When this timer expires the WTRU may delete the fingerprint associated to the HNB.

In another example implementation, a periodic timer may be used to delete periodically all the HNB fingerprints stored in the WTRU.

In another example implementation, the network may request the WTRU to delete one or a list of all the HNB fingerprints the WTRU has stored by sending an RRC message to the WTRU.

In another example implementation, in case the handover to a particular HNB is rejected by the network, the WTRU may delete the associated fingerprint.

Described herein are embodiments for HNB PSC detection via transmission. In one embodiment, the inter-frequency PSC (or PCI) detection may be performed via the HNBs' transmissions of the common pilot channel (CPICH) on the serving macro cell frequency (or transmission of primary and secondary synchronization signals (PSS and SSS) for LTE). In this embodiment, only the CPICH (for UMTS) or PSS/SSS (for LTE) is transmitted, without any of the System Information Blocks (SIBs). The signals necessary to detect a PSC or PCI (CPICH for UMTS, PSS/SSS for LTE) are transmitted by the HNB on the serving macro cell frequency. Optionally, in addition to the CPICH, the master information block (MIB) indicating the frequency of the HNB and that the cell is a HNB cell may be broadcast. The WTRU performing intra-frequency measurements may detect the PSCs and, therefore, may request gaps from the network to perform additional measurements on the HNB's corresponding frequency (if known from signaling from the macro cell or otherwise indicated). If it is not known from the macro cell's signaling or from other indications, the WTRU may have to rely on fingerprint information or even measure on all other frequencies.

The gaps may be requested on one, or a combination of, the following conditions: the WTRU detects HNB's PSCs (or PCIs); the WTRU detects an HNB PSC (or PCI) that is in its whitelist; the WTRU detects an HNB PSC (or PCI) that is contained within a known fingerprint location; the WTRU performs a manual search and detects that there are HNBs in the neighboring frequencies; the WTRU performs a periodic search; the WTRU detects an HNB PSC (or PCI) that is in a reserved PSC or PCI range of hybrid cells; and the WTRU detects an HNB PSC (or PCI) that is in a reserved PSC range or PCI range of CSG cells.

Signaling of supported HNB PSC/PCI detection methods on inbound mobility support are disclosed hereinafter.

The different HNB PSC/PCI detection methods disclosed herein may be fully or only partially supported by the WTRU. The WTRU may indicate to the network which methods it supports by adding new IEs in existing RRC messages (for example, in the RRC Connection Request or the RRC Connection Setup Complete) or in a new RRC message. One or a combination of the following capabilities may be indicated by the WTRU to the network: a) WTRU capable to request for gaps for detecting HNB PSC/PCI on a frequency (e.g. inter or intra-frequency to the same RAT as the macro cell); b) WTRU capable to request for gaps for detecting HNB PSC/PCI in a different RAT; and c) WTRU capable to detect PSC/PCI of inter-frequency HNB transmitting their CPICH for UMTS or PSS/SSS for LTE on the serving macro-cell frequency. As described above, requesting gaps may correspond to the capability of detecting that you are in the vicinity or proximity of a CSG cell whose CSG belongs to the WTRU's whitelist.

In addition, the network may deactivate any of the supported methods mentioned hereinabove in the WTRU by explicit signaling.

Even if the WTRU supports the above mentioned capabilities, the network also needs to support this mobility procedure. In general, the WTRU and network both need to support mobility in the case where a WTRU enters or exits the vicinity or proximity of a HNB. As described herein, the WTRU may request or enable the detection and triggering of requests for measurement configurations and any gaps or trigger events if the WTRU knows that the network supports inbound mobility and the WTRU also supports it.

In order to determine that the network supports inbound mobility and more specifically the triggers described above, one or a combination of the following methods may be used. For illustrative purposes, inbound mobility may refer to the ability to detect proximity to a HNB and to send/receive reports/events in response to the proximity detection, for example, when the WTRU enters/exits the vicinity (proximity) of the HNB. In one example method, the events to trigger detection mechanisms for inbound mobility are configured by the network via measurement control/configuration messages. If such measurement types or events are not configured (e.g., not present in the configuration messages), the WTRU determines that inbound mobility detection is not supported. Depending on the measurements that are configured, the WTRU implicitly determines whether inter-frequency, inter-RAT or intra-frequency mobility is supported. For example, in the case where a new measurement type, 8, is introduced as described above, inter-frequency or intra-frequency CSG detection mechanisms can be configured for a certain RAT. If not configured then the WTRU determines that the network does not support inbound detection mechanism for the given RAT and therefore disables the functionality.

In another example method, the network explicitly signals to the WTRU upon RRC connection procedures, that inbound mobility to HNBs is supported. If the WTRU moves to an area where inbound mobility is not supported, the network may inform the WTRU of the change of capability.

In another example method, the network may explicitly indicate whether inter-frequency inbound mobility is supported, whether inter-RAT mobility is supported, or whether intra-frequency inbound mobility is supported. In the case of inter-RAT mobility, the network may also explicitly indicate whether just LTE to HNB UMTS mobility is supported, UMTS to LTE HNB mobility is supported or any inter-RAT mobility is supported.

Events similar to the ones described above may also be used, wherein the WTRU may provide the network with any of the information described above.

Figure 7:
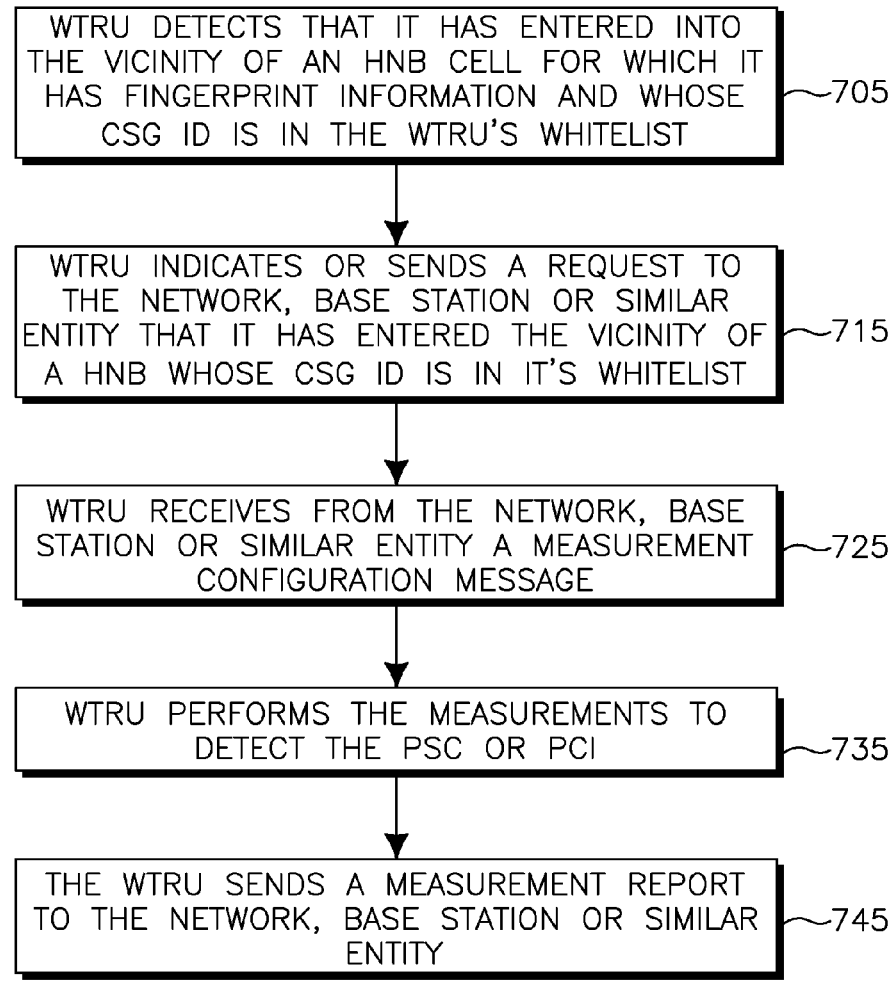
FIG. 7 is an example method with respect to a WTRU entering a cell of a HNB.

FIG. 7 illustrates a method 700 for implementing the examples and embodiments described herein in the case of a WTRU entering the cell or frequency of an HNB. Upon entering the cell or frequency of the HNB, the WTRU and network perform a capability exchange to determine if inbound mobility is supported by the WTRU and network. The network may need to configure the WTRU with the events that trigger the measurements. The WTRU detects via, for example, fingerprint information that it has entered into the vicinity of an HNB cell whose CSG ID is in the WTRU's whitelist (705). The WTRU then indicates to the network that it has entered the vicinity of a HNB whose CSG ID is in its whitelist (715). The indication or request message may include HNB information, such as the frequency or RAT for the HNB which triggered the report. The indication or request message may be sent via a radio resource control (RRC) message or a Measurement Report. The Measurement Report may contain the proximity indication. The WTRU then receives from the network, base station or other similar entity as determined by system architecture or structure, a measurement configuration message that may include gaps and the PSCs/PCIs to measure (725) and performs the measurements to detect the PSC or PCI (735). The WTRU may then send a measurement report to the base station (745). The measurement report may include an Information Element (IE) containing, for example, a detection result, measurement results for the cells that are on the frequency added by the measurement configuration and a triggering of an existing mobility event such as, for example event type 1D or 1A.

Figure 8:
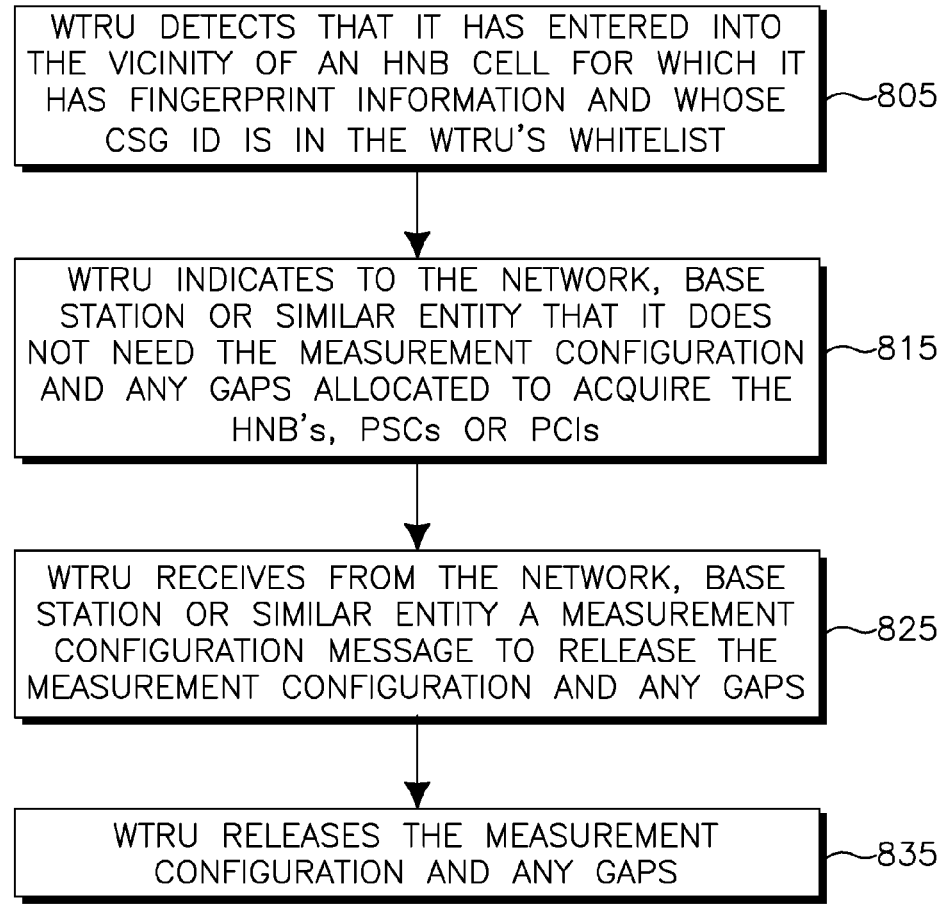
FIG. 8 is an example method with respect to a WTRU exiting a cell of a HNB.

FIG. 8 illustrates a method 800 for implementing the examples and embodiments described herein in the case of a WTRU exiting the cell or frequency of an HNB. As in FIG. 7, a capability exchange may be performed between the WTRU and the network including the sending of configuration information for the events that trigger the measurements. Initially, the WTRU detects, via for example, the use of fingerprint information, that it is exiting the vicinity of an HNB cell whose CSG ID is in the WTRU's whitelist (805). The WTRU then indicates to the network, base station or similar entity that may be dependent on system, that it is leaving the HNB area (e.g., that it may no longer need the measurement configuration or gaps allocated to acquire the HNB's PSCs or PCIs) (815). The indication or request message may be sent via a radio resource control (RRC) message or a measurement report. The WTRU then receives from the network, base station or similar entity that may be dependent on system, a configuration message to release the measurement configuration, which may have included gaps (825) and the WTRU then releases the configuration (835).

Described herein are additional embodiments. In an example embodiment, the WTRU may be configured for discontinuous reception (DRX) and may have enough idle periods to detect the PSC and read the system information of the HNB. The WTRU may start the handover procedure evaluation if the macro cell quality is good. A limit on the duration during which the WTRU tries to acquire the SIBs may be applied in order to limit the power usage of the WTRU. For example, the WTRU may stop the inter-RAT handover procedure when a timer expires.

In another embodiment, in case event B1 is configured by the network, where event B1 is "Inter-RAT neighbor becomes better than threshold", the WTRU may not report or may not trigger the event in case it is connected to, for example, a LTE macro cell, and the inter-RAT neighbor cell that is becoming better than a threshold is, for example, an UMTS HNB. In this instance, the LTE macro cell may have a higher priority than the UMTS HNB. If the WTRU detects that the PSC corresponds to a HNB, the WTRU may trigger the measurement report indicating the event B1 and additionally signal a proximity indication. The proximity indication may be added to the same measurement report or to a different measurement report that may be used to initiate autonomous search in the WTRU. As indicated earlier, the roles of the specific RATs may be interchanged in the examples and are used herein as illustrative examples.

This new restriction about inbound mobility from the macro LTE cell to an UMTS HNB, may prevent the user who owns a LTE capable WTRU but has a UMTS HNB, to handover to the UMTS HNB if the UMTS HNB is in the coverage of the LTE macro cell. One method for connecting to the UMTS HNB would be to drop the connection to the LTE macro cell so that the WTRU may camp on the UMTS HNB in Idle mode. Alternatively, if the user wants to switch to the UMTS HNB while in connected mode, an optional indicator may be added in the fingerprint information stored for the UMTS HNB that would force the WTRU to perform an inter-RAT handover or initiate an autonomous search from a LTE macro cell to this particular UMTS HNB. For instance, the flag in the fingerprint information may be used as an absolute priority indicator for the UMTS HNB. In this instance, no matter what RAT or frequency the WTRU is connected on, the HNB takes priority over all the other macro cells and therefore an autonomous search is triggered and the proximity indicator is signaled to the network. Additional information may be added in the proximity indication including the RAT and the priority associated with the RAT.

In another example method, such inter-RAT autonomous search or handover may also be initiated by the user using a manual search even if the conditions described earlier to measure the HNB in the other RAT have not been met. In such cases, if the WTRU detects that a search has been initiated, and the WTRU has a stored HNB on another RAT in its fingerprint information, the WTRU may immediately attempt to decode the NB that is in its fingerprint information. Optionally, the manual search by the user may trigger the WTRU to decide that a proximity indication in a measurement report may be sent to the network to initiate measurement and detection of the HNB even if the conditions discussed above have not been met. In this method, the manual trigger by the user may overrule the set priorities between the RATs and HNBs.

In another example method, it may be specified that the WTRU gives preference to a member HNB on a different RAT than the serving macro cell. This preferential treatment may occur when the HNB is using the same RAT as a reference HNB that may include, for example, a HNB installed at a user's home or any HNB as indicated by the user. The reference HNB may be indicated in the fingerprint information stored in the WTRU. The rules for restricting the inter-RAT inbound handover may include fulfilling the following conditions: 1) current macro serving cell is on a different RAT than a target HNB; 2) target HNB, using a different RAT than the reference HNB, matches fingerprint information stored in the WTRU; and 3) macro serving cell quality is below a certain threshold. This threshold may be configured by the network, may be a fixed value used by the WTRU or may be determined by the WTRU. The threshold may be a common value or a value per cell. Optionally, the conditions may need to persist for a given period of time.

If all three conditions are met, then the WTRU sends a measurement report to the network in order to request a measurement configuration that may include gaps for detecting the PSC/PCI, acquiring the system information or to ask for the authorization to use autonomous gaps. If only conditions 1 and 2 are met, the WTRU may not send any report to the network to trigger the HNB measurements. Alternatively, the WTRU may still send a measurement report indicating that the proximity indication corresponds to a HNB and may include in the measurement report the RAT of the HNB. The network may chose to allow the WTRU to start searching and measuring the HNB belonging to a RAT other than the macro serving cell upon explicit indication from the network.

In another example method, priorities between the RATs and HNBs may be explicitly set by the network. The network may explicitly indicate to the WTRU that a LTE macro cell and/or LTE HNB have priority over a UMTS HNB. The WTRU, therefore, may initiate a UMTS HNB search (that is in its proximity) if the quality of the LTE macro cell or LTE HNB goes below a threshold as described above. Other examples may include a LTE HNB that may have priority over a UMTS macro cell or vice versa.

Priority indication for mobility between a macro cell on one RAT and a HNB in another RAT may be different than inter-RAT priority for macro cell to macro cell mobility. For instance, even if LTE has higher priority for inter-RAT macro cell to macro cell, the same rules may not be applicable if a UMTS HNB is in its vicinity. In such a case, either the UMTS HNB may have been signaled to have higher priority or by implicit rule it has higher priority. If no priority indication has been signaled for the HNB in the other RAT, the WTRU may assume: 1) that the HNB has priority as for normal inbound mobility cases; 2) that the HNB in the other RAT will inherit the same inter-RAT mobility priorities as the ones indicated for macro cell to macro cell rules; or 3) it will act according to one of the rules described above. The HNB priority setting described herein may also be applicable for HNB to macro cell priorities within the same frequency.

The inbound HNB priority indication (which may be applicable to frequency or RAT) may be set for all CSGs belonging to a RAT or frequency or may be set on a per CSG basis. Upon successful registration, the priorities of the CSG and the RAT may be set and optionally updated later. For instance, for some CSGs (e.g., the user's home CSG), the network may prefer that the WTRU try to connect to this CSG even if the WTRU is camped/connected to the other frequency or RAT. However, for some CSGs the network may prefer that the WTRU does not connect to this CSG (i.e., only connects if the quality of the current macro cell is below a threshold).

Alternatively, absolute HNB RAT priorities and optionally absolute frequency priorities may be signaled. For instance, the network may assign different RAT priorities. For example, if the detected HNB has a HNB RAT priority higher than the RAT or frequency the WTRU is connected to, the WTRU may initiate an autonomous search in an effort to connect to this HNB. If the detected HNB is in a lower priority HNB RAT, it may start autonomous search if the quality of the current RAT or frequency is below a threshold. The thresholds described in this disclosure for the current connected RAT, may be similar to thresholds used for normal inter-RAT mobility or alternatively HNB specific thresholds which may be less strict and may allow the WTRU to connect to the HNB earlier. The priorities may be indicated by signaling or in the broadcasted system information.

In general, when a HNB in the WTRU's proximity has a higher priority than the current macro cell (according to priorities set with respect to any frequency and/or RAT as described above), the WTRU may initiate an autonomous search (e.g. try to perform a handover to this HNB). The autonomous search, for example, may comprise the transmission of a measurement report and/or proximity indication to the network and/or attempt to read SI. If this HNB has a lower priority than the current RAT, an autonomous search may be triggered if the quality of current macro cell is below a threshold and optionally, if the quality is below a threshold for a configured amount of time. This criteria is similar to the criteria described above for fixed priority settings.

In certain situations, there may be an abundance of opportunities for inter-RAT inbound handover attempts. For example, users may purchase a HNB for one RAT and then upgrade to another HNB with a different RAT. In other situations, they may have WTRUs for one RAT and a HNB on another RAT and then decide to buy the HNB of the same technology as the WTRU. In addition, some WTRUs may be multiple RAT capable while other WTRUs may be single RAT. These situations may lead to many inter-RAT inbound handover attempts by the WTRU. This may be undesirable due to excessive battery usage and service degradation. In order to limit the number of handover evaluation procedures when the user is a macro cell coverage and moves between HNBs of different RATs, the WTRU may use a special CSG-inter-RAT Time to Trigger longer than the timer configured by the network. Alternatively, there may be a CSG inter-RAT offset added to the configured time to trigger. In these cases, when a fingerprint match occurs the event report is therefore not triggered too quickly. Since most HNBs are deployed for service enhancement purposes, it is acceptable that the WTRU stays connected on the macro cell for a longer period of time in order to limit unnecessary inter-RAT inbound handovers. For example, if the following conditions are fulfilled: 1) the WTRU is connected to a macro cell of a certain RAT; 2) the WTRU detects a fingerprint match for a HNB of a different RAT; and 3) the WTRU verifies that the HNB quality is above a certain CSG-inter-RAT threshold during the CSG-inter-RAT Time To Trigger duration, then the WTRU may report a measurement event for this HNB to the network.

If conditions 1 and 2 are met but condition 3 is not met and if the quality of the macro serving cell is not acceptable (e.g., below a certain threshold), the WTRU may also report a measurement event for this HNB to the network. Otherwise the WTRU does not send a measurement report and remains connected to the macro serving cell.

The CSG-inter-RAT Time to Trigger may be used by the WTRU when evaluating inter-RAT events B1, B2 for LTE, 3A, 3C events for UMTS, or new events specified for HNB. The CSG-inter-RAT threshold may be configured by the network, but may also be a threshold determined by the WTRU so that the WTRU may give a certain preference to member HNBs.

Alternatively, condition 3 may be deleted and condition 2 may be replaced by an alternative condition 2, where the WTRU may detect a fingerprint match for a HNB on a different RAT and this fingerprint match is verified during the CSG-inter-RAT Time To Trigger duration. In this alternative, there may not be any condition on the HNB signal quality, but it is assumed that in case of a fingerprint match the quality of the HNB should be good.

In another implementation, it may be specified that the WTRU has to stay connected to the macro serving cell for a certain period of time before it may trigger an event to start the inter-RAT HNB handover measurements. The timer duration may be signaled by the network, or may be a pre-determined value known by the WTRU. It may also be a value stored in the fingerprint information per HNB so that the WTRU may be handed over to certain HNBs faster than for others. If the timer has not expired yet, but the serving macro cell quality is not acceptable anymore (e.g., below a certain threshold), the WTRU may be allowed to trigger an event to start the handover measurements for the HNB in case there is no other neighbor macro cell with good quality available. For example, it may be decided that handovers from UMTS macro cells to LTE HNBs may occur faster than handovers from LTE macro cells to UMTS HNBs.

In order for the WTRU to build its fingerprint information list for other RAT HNBs in Idle mode, the WTRU needs to be aware of the PCI/PSC split for CSG cells of other RATs. For example, the UMTS PSC split may be broadcast in the LTE system information while the LTE PCI split may be broadcast in the UMTS system information. The LTE SIB4 may be enhanced with a new IE umts-csg-PSC-Range while the UMTS SIB11bis may be enhanced with a new IE "LTE CSG PCI Split information". This inter-RAT HNB split information may also be added in other existing SIBs or in new SIBs. This allows the WTRU, during an autonomous search or a manual search, to recognize which detected PSC/PCI belongs to other RATs CSG cells. When storing the fingerprint information, the WTRU may also store the type of RAT of the CSG cell (e.g., LTE or UMTS) so that once the WTRU is in connected mode; the WTRU may apply the rules defined for inter-RAT inbound mobility as described herein. Alternatively, the PSC/PCI splits for the other technology may be sent to the WTRU via dedicated RRC signaling, (e.g., measurement control). The network may provide the PSC/PCI split for the other RAT periodically, or the reporting may be started by one or a combination of the following triggers including: 1) the macro serving cell measurements reported by the WTRU to the network to show that the macro serving cell quality is deteriorating (e.g., is below a certain threshold); 2) the user activity is increasing leading to a demand of higher data rates; and 3) the network detects that the WTRU is in a neighborhood where only HNBs of a different RAT than the macro serving cell are available or just a few HNBs of the same RAT than the current macro serving cell are available.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method performed by a network entity, the method comprising:
   receiving an indication from a wireless transmit/receive unit (WTRU) that is configured to detect, based on fingerprint information, that the WTRU has entered into a proximity of a home Node-B or home (evolved) Node-B (HNB) cell whose closed subscriber group (CSG) ID is in a whitelist of the WTRU, wherein the indication includes a frequency of the HNB cell and a Radio Access Technology (RAT) of the HNB cell;

transmitting a measurement configuration message to the WTRU to perform measurements on the HNB cell.

2. The method of claim 1, wherein the measurement configuration message enables the WTRU to detect one of a primary scrambling code (PSC) or a physical cell identity (PCI) of the HNB cell on the frequency and the RAT.

3. The method of claim 2, wherein the measurement configuration message indicates to the WTRU to measure the frequency or the RAT with one of a compressed mode or measurement gap.

4. The method of claim 1, wherein the measurement configuration message comprises one of an intra-frequency measurement, inter-frequency measurement or inter-RAT measurement.

5. The method of claim 1, wherein the indication indicates a cell identity of the HNB cell that triggered the indication.

6. The method of claim 1, further comprising receiving, from the WTRU, an indication of support of HNB cell detection.

7. The method of claim 1, further comprising transmitting a configuration for the RAT to the WTRU, wherein the configuration enables proximity detection and sending/receiving of reports in response to proximity detections on a condition that the WTRU enters or exits the proximity of the HNB cell.

8. The method of claim 1, further comprising receiving a notification from the WTRU that the WTRU is exiting the proximity of the HNB cell whose CSG ID is in the whitelist of the WTRU.

9. The method of claim 8, further comprising transmitting a configuration removing a measurement configuration.

10. The method of claim 1, wherein the indication is not received from the WTRU more than a certain number of times during a certain period of time.

11. The method of claim 1, wherein the network entity is a base station.

12. A network entity, comprising:
a processor;
a receiver in communication with the processor;
the processor and receiver configured to receive an indication from a wireless transmit/receive unit (WTRU) that is configured to detect, based on fingerprint information, that the WTRU has entered into a proximity of a home Node-B or home (evolved) Node-B (HNB) cell whose closed subscriber group (CSG) ID is in a whitelist of the WTRU, wherein the indication includes a frequency of the HNB cell and a Radio Access Technology (RAT) of the HNB cell;

a transmitter in communication with the processor;

the transmitter configured transmit a measurement configuration message to the WTRU to perform measurements on the HNB cell.

13. The network entity of claim 12, wherein the measurement configuration message enables the WTRU to detect one of a primary scrambling code (PSC) or a physical cell identity (PCI) of the HNB cell on the frequency and the RAT.

14. The network entity of claim 13, wherein the measurement configuration message indicates to the WTRU to measure the frequency or the RAT with one of a compressed mode or measurement gap.

15. The network entity of claim 12, wherein the measurement configuration message comprises one of an intra-frequency measurement, inter-frequency measurement or inter-RAT measurement.

16. The network entity of claim 12, wherein the indication indicates a cell identity of the HNB cell that triggered the indication.

17. The network entity of claim 12, wherein the receiver is further configured to receive, from the WTRU, an indication of support of HNB cell detection.

18. The network entity of claim 12, wherein the transmitter is further configured to transmit a configuration for the RAT to the WTRU, wherein the configuration enables proximity detection and sending/receiving of reports in response to proximity detections on a condition that the WTRU enters or exits the proximity of the HNB cell.

19. The network entity of claim 12, wherein the receiver is further configured to receive a notification from the WTRU that the WTRU is exiting the proximity of the HNB cell whose CSG ID is in the whitelist of the WTRU.

20. The network entity of claim 19, wherein the transmitter is further configured to transmit a configuration removing a measurement configuration.

21. The network entity of claim 12, wherein the indication is not received from the WTRU more than a certain number of times during a certain period of time.

22. The network entity of claim 12, wherein the network entity is a base station.

* * * * *